US010462006B2

(12) United States Patent
Sattler et al.

(10) Patent No.: US 10,462,006 B2
(45) Date of Patent: Oct. 29, 2019

(54) HYBRID ENVIRONMENT TO SUPPORT RELIABLE DELIVERY OF MULTICAST TRAFFIC USING AN ORCHESTRATION DEVICE

(71) Applicant: Verizon Patent and Licensing Inc., Arlington, VA (US)

(72) Inventors: Lee E. Sattler, Mount Airy, MD (US); Christopher Allen Lenart, Ashburn, VA (US); Hassan M. Omar, Pleasantville, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 797 days.

(21) Appl. No.: 14/975,056

(22) Filed: Dec. 18, 2015

(65) Prior Publication Data

US 2017/0180203 A1  Jun. 22, 2017

(51) Int. Cl.
*H04L 12/24* (2006.01)
*H04L 12/26* (2006.01)
*H04L 29/06* (2006.01)

(52) U.S. Cl.
CPC ...... *H04L 41/0816* (2013.01); *H04L 43/0823* (2013.01); *H04L 65/4076* (2013.01)

(58) Field of Classification Search
CPC ......... H04L 12/18; H04L 45/02; H04L 67/16; H04L 69/40
See application file for complete search history.

(56) References Cited

U.S. PATENT DOCUMENTS

| | | | | |
|---|---|---|---|---|
| 6,983,324 B1* | 1/2006 | Block | ............... | H04L 67/1002 709/204 |
| 9,619,989 B1* | 4/2017 | Ewing | ............... | G08B 21/245 |
| 2003/0012130 A1* | 1/2003 | Novaes | ............... | H04L 12/1854 370/218 |
| 2004/0267876 A1* | 12/2004 | Kakivaya | ............... | H04L 67/16 709/200 |
| 2007/0110063 A1* | 5/2007 | Tang | ............... | H04L 45/02 370/390 |
| 2007/0291661 A1* | 12/2007 | Nishibayashi | ............... | H04L 12/66 370/252 |
| 2008/0170550 A1* | 7/2008 | Liu | ............... | H04L 49/602 370/338 |

(Continued)

OTHER PUBLICATIONS

Chiosi et al., "p. 1 of 16 Network Functions Virtualisation," https://portal.etsi.org/NFV/NFV_White_Paper.pdf, Oct. 22, 2012, 16 pages.

(Continued)

*Primary Examiner* — Barbara B Anyan

(57) ABSTRACT

A device may receive information associated with a reliable multicast service, that permits retransmission of multicast datagrams to be provided. The device may receive information associated with a plurality of network devices associated with providing the reliable multicast service. The device may configure the plurality of network devices to provide the reliable multicast service and may monitor the plurality of network devices. The device may detect an event associated with the reliable multicast service and may provide an instruction, to one or more network devices of the plurality of network devices, to modify the reliable multicast service based on detecting the event.

20 Claims, 18 Drawing Sheets

(56) References Cited

U.S. PATENT DOCUMENTS

| | | | | |
|---|---|---|---|---|
| 2009/0064248 A1* | 3/2009 | Kwan | ............... | H04L 12/1868 725/109 |
| 2010/0014520 A1* | 1/2010 | Matsumoto | ......... | H04L 12/1868 370/390 |
| 2010/0074143 A1* | 3/2010 | Ewing | ................ | H04L 1/1867 370/254 |

OTHER PUBLICATIONS

Perkins, "IP Mobility Support for IPv4, Revised," http://tools.ietf.org/pdf/rfc5944.pdf, Nov. 2010, 100 pages.
Fogelstroem et al., "Mobile IPv4 Regional Registration," http://www.rfc-archive.org/getrfc.php?rfc=4857, Jun. 2007, 38 pages.
Levine et al., "A comparison of reliable multicast protocols," http://ccrg.soe.ucsc.edu/publications/brian.mmsj.pdf, 1998, 15 pages.
Bailey et al., "SDN Architecture Overview," https://www.opennetworking.org/images/stories/downloads/sdn-resources/technical-reports/SDN-architecture-overview-1.0.pdf, Dec. 12, 2013, 5 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |S|B|D|M|G|V|rsv|           Lifetime            |
+-+-+-+-+-+-+-+-+-+-+-+-+-+-+-+-+-+-+-+-+-+-+-+-+-+-+-+-+-+-+-+-+
|                          Home Address                         |
+-+-+-+-+-+-+-+-+-+-+-+-+-+-+-+-+-+-+-+-+-+-+-+-+-+-+-+-+-+-+-+-+
|                          Home Agent                           |
+-+-+-+-+-+-+-+-+-+-+-+-+-+-+-+-+-+-+-+-+-+-+-+-+-+-+-+-+-+-+-+-+
|                         Care-of Address                       |
+-+-+-+-+-+-+-+-+-+-+-+-+-+-+-+-+-+-+-+-+-+-+-+-+-+-+-+-+-+-+-+-+
|                                                               |
+                         Identification                        +
|                                                               |
+-+-+-+-+-+-+-+-+-+-+-+-+-+-+-+-+-+-+-+-+-+-+-+-+-+-+-+-+-+-+-+-+
| Hierarchical Foreign Agent Extension
+-+-+-+-+-+-+-+-+-+-+-+-+-+-+-+-+-
+-+-+-+-+-+-+-+-+-+-+-+-+-+-+-+-+-+-+-+-+-+-+-+-+-+-+-+-+-+-+-+-+
|     Type      |    Length     |     Flags     |     rsvd      |
+-+-+-+-+-+-+-+-+-+-+-+-+-+-+-+-+-+-+-+-+-+-+-+-+-+-+-+-+-+-+-+-+
|                 Multicast IP address for group G1             |
+-+-+-+-+-+-+-+-+-+-+-+-+-+-+-+-+-+-+-+-+-+-+-+-+-+-+-+-+-+-+-+-+
|     Type      |    Length     |     Flags     |     rsvd      |
+-+-+-+-+-+-+-+-+-+-+-+-+-+-+-+-+-+-+-+-+-+-+-+-+-+-+-+-+-+-+-+-+
|                 Multicast IP address for group G2             |
+-+-+-+-+-+-+-+-+-+-+-+-+-+-+-+-+-+-+-+-+-+-+-+-+-+-+-+-+-+-+-+-+
```

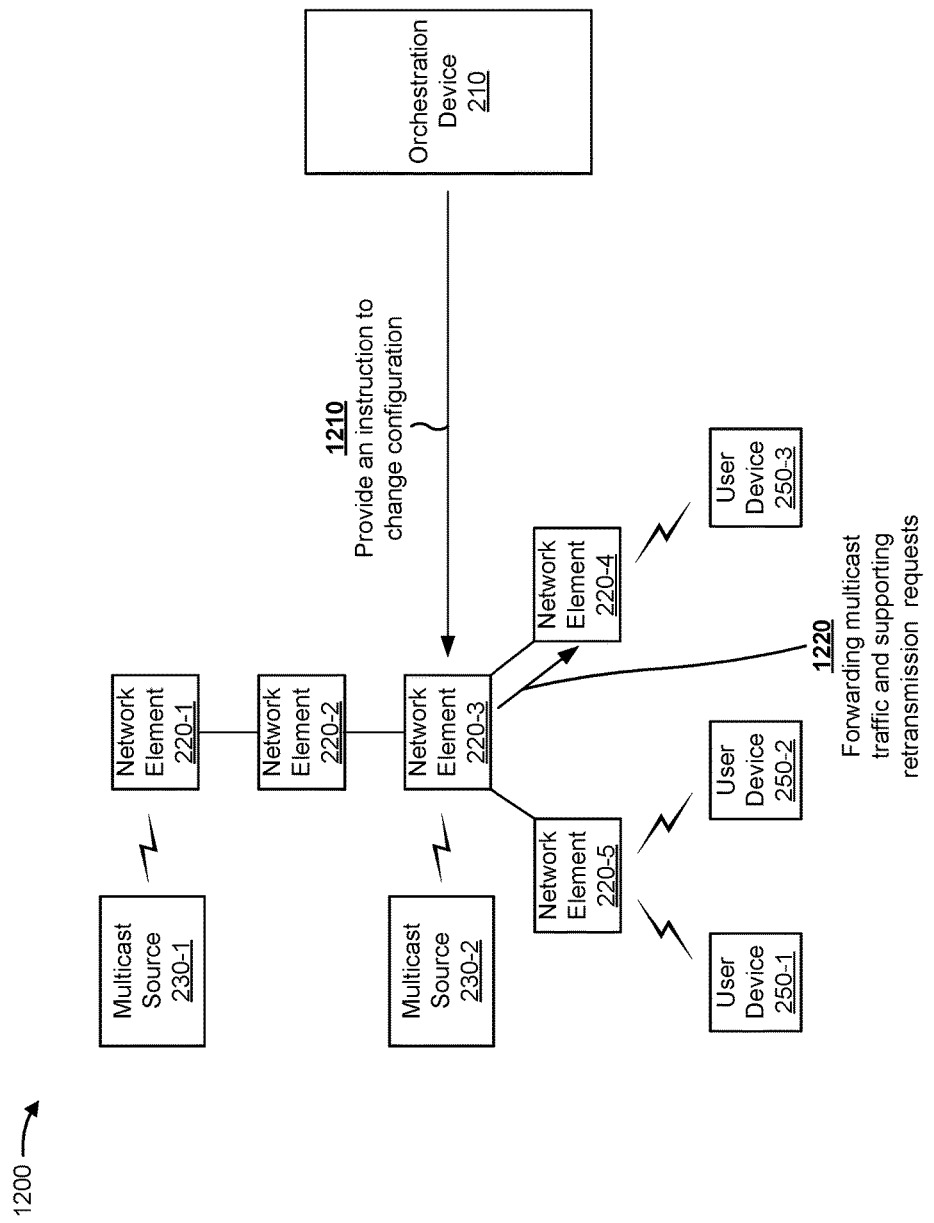

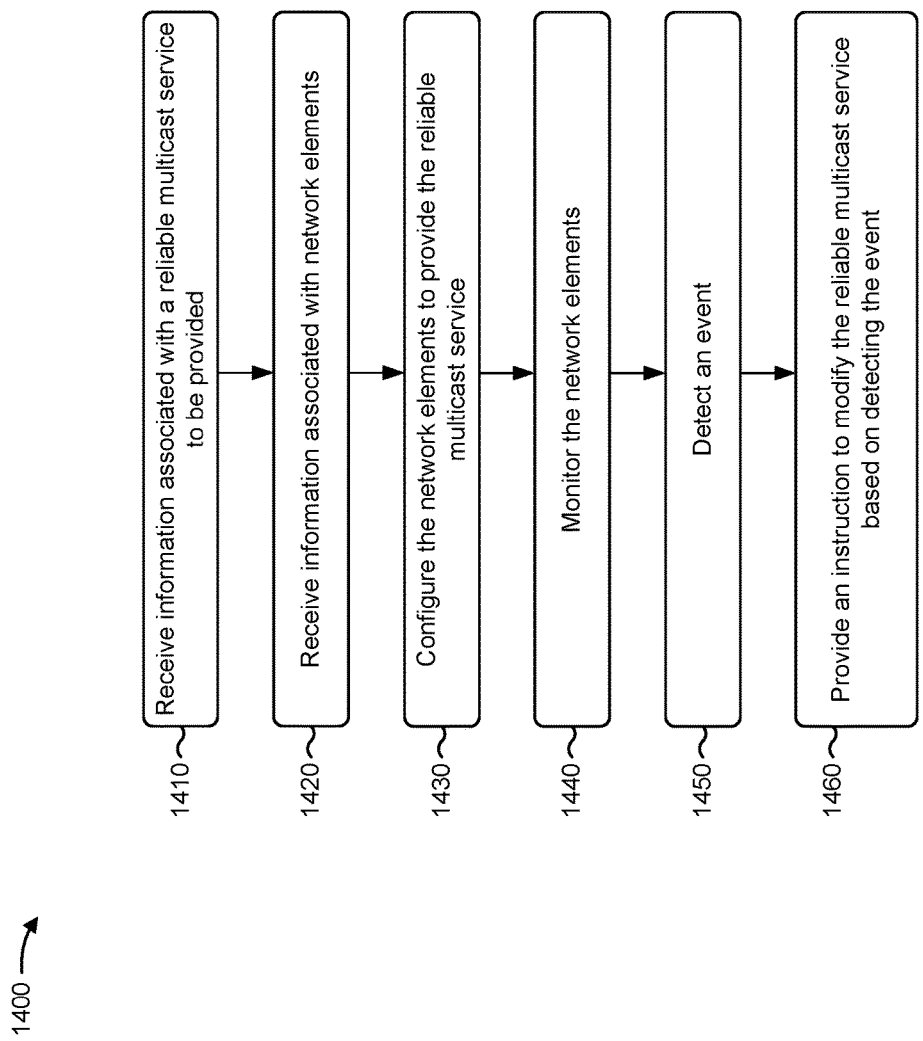

HYBRID ENVIRONMENT TO SUPPORT RELIABLE DELIVERY OF MULTICAST TRAFFIC USING AN ORCHESTRATION DEVICE

BACKGROUND

Multicast enables communication between a single sender and multiple receivers on a network. Software delivery, teleconferencing, financial information delivery, and other loss-sensitive applications may require guaranteed delivery to each receiver. A reliable multicast protocol ensures that a reliable sequence of packets is provided to multiple receivers.

BRIEF DESCRIPTION OF THE DRAWINGS

FIG. 8 is a diagram of an example message structure associated with a registration request message;

FIGS. 11A, 11B, 12A, 12B, 13A, and 13B are diagrams of example implementations relating to the example process shown in FIG. 10; and FIG. 14 is a flow chart of an example process for configuring and modifying a reliable multicast service.

DETAILED DESCRIPTION OF PREFERRED EMBODIMENTS

The following detailed description of example implementations refers to the accompanying drawings. The same reference numbers in different drawings may identify the same or similar elements.

A network service provider may configure network devices to provide a reliable multicast service. However, static network configurations may not adequately address conditions associated with the reliable multicast service and/or may not provide the reliable multicast service in an optimized manner. For example, the network devices, the wired and/or wireless network infrastructure, and/or the user devices associated with the reliable multicast service may be associated with different capabilities, requirements, etc. that may change as the multicast service is being provided. Additionally, mobility events associated with user devices may influence the reliable multicast service and may require a dynamic approach to providing the reliable multicast service.

If a rate at which a particular network device receives and/or processes multicast traffic is less than the rate of generation of multicast traffic by a multicast source, then the multicast source may be required to reduce a transmission rate of multicast traffic in order to maintain reliable delivery, thereby affecting delivery of multicast datagrams to other network devices and/or user devices. Further, the multicast source may discontinue providing multicast traffic to the particular network device that is exhibiting the reduced processing rate. Thus, reliable delivery of multicast datagrams to particular network devices and/or user devices may become compromised. Additionally, user devices may fail to receive multicast traffic based on mobility events. Implementations described herein may allow dynamic configuration of a network and/or network devices to accommodate demand for a reliable multicast service and/or to accommodate events associated with the reliable multicast service.

Figure 1A:
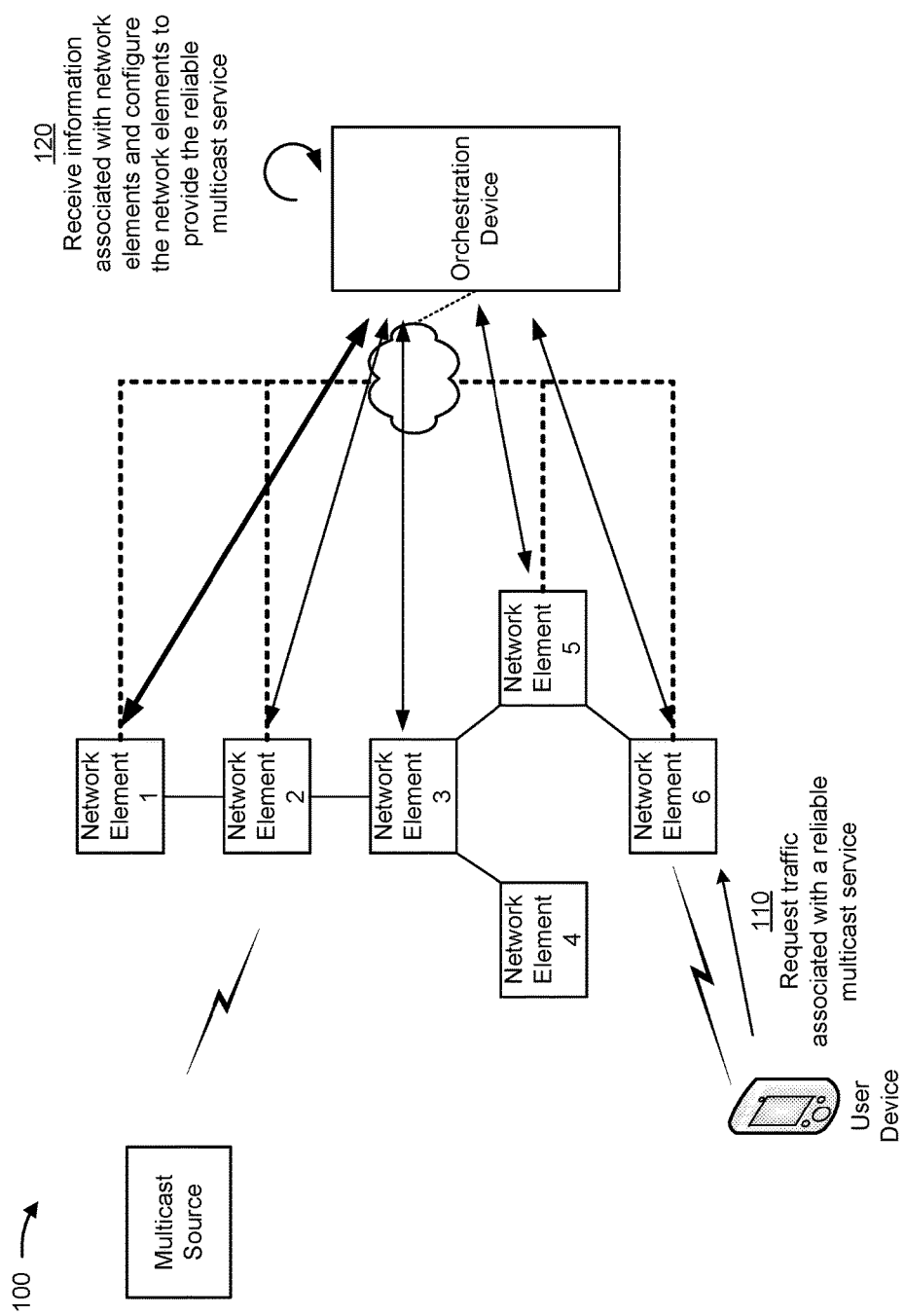
FIGS. 1A and 1B are diagrams of an overview of an example implementation described herein.
Figure 1B:
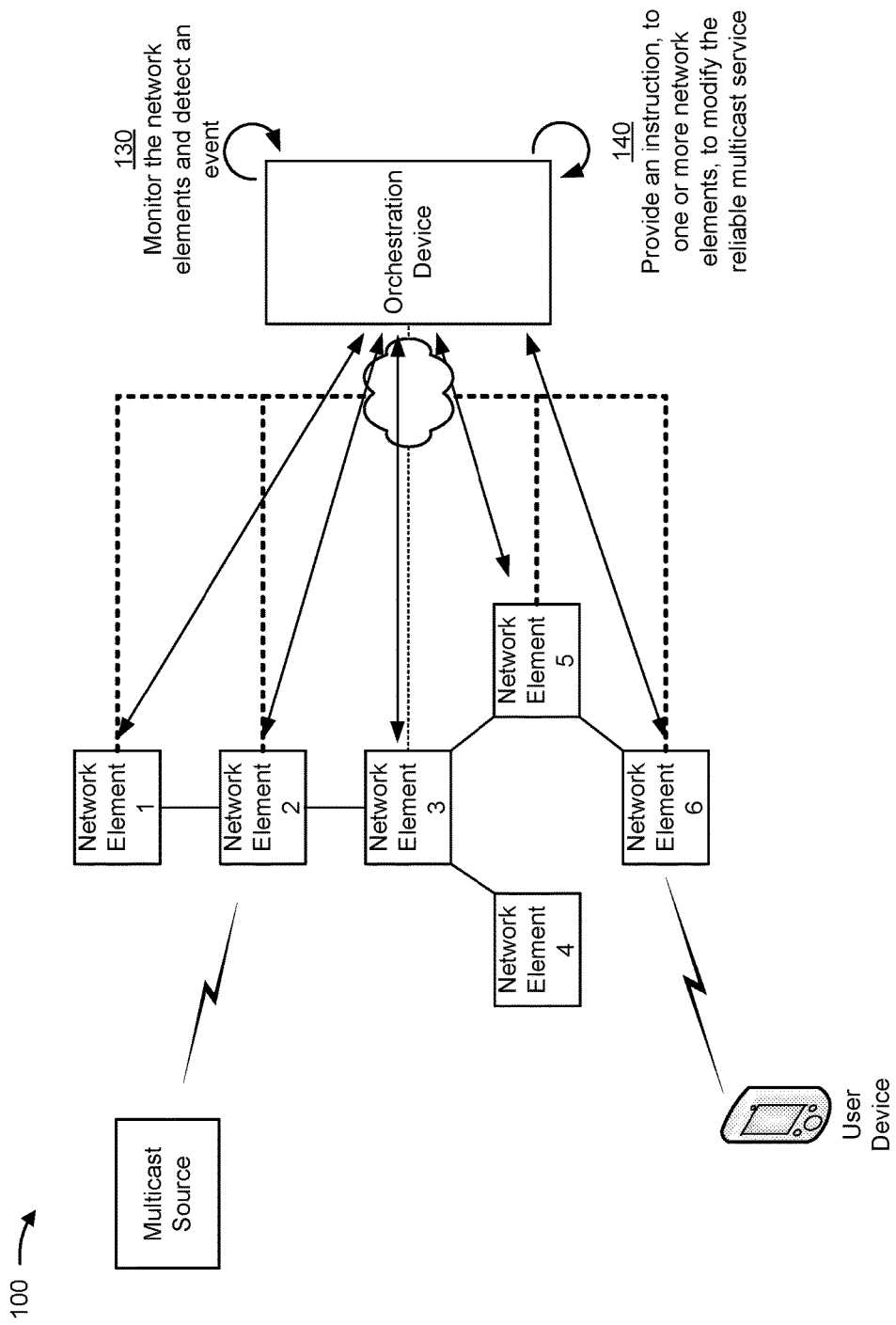

FIGS. 1A and 1B are diagrams of an overview of an example implementation 100 described herein. As shown in FIG. 1A, example implementation 100 may include an orchestration device, one or more network elements, a multicast source, and a user device. As shown in FIG. 1A, and by reference number 110, a network element may receive, from a user device, a registration request to receive multicast traffic from a multicast source. As shown by reference number 120, an orchestration device may receive information associated with the network elements and may configure the network elements to provide the reliable multicast service.

For example, the orchestration device may receive information identifying the types of network elements (e.g., routers, switches, etc., which may be standalone devices or may be included in a virtual environment), the capabilities of the network elements (e.g., processor capabilities, memory capabilities, bandwidth capabilities, etc.), the geographic locations of the network elements, or the like. Additionally, or alternatively, the orchestration device may receive historical information associated with the network elements with regard to providing the reliable multicast service (e.g., statistics regarding multicast datagram loss, multicast datagram retransmission requests, multicast datagram forwarding rates, etc. associated with one or more network elements). The orchestration device may configure the network elements to provide the reliable multicast service based on the received information, such that the reliable multicast service is provided in a more efficient manner (e.g., resources and/or functionality may be allocated to particular network elements).

For example, the orchestration device may configure a network element (e.g., network element 2, shown in FIG. 1A) to request multicast datagrams from the multicast source, to receive multicast datagrams from the multicast source, and to forward multicast datagrams to other network elements and/or user devices. For example, assume that the orchestration device determines that network element 2 has available resources (e.g., processor resources, memory resources, etc.) to receive, process, and/or store datagrams received from the multicast source such that a quantity of retransmission requests provided to the multicast source is reduced (e.g., minimized). Additionally, or alternatively, the orchestration device may configure other network elements (e.g., network element 3, network element 5, network element 6, or the like, as shown in FIG. 1A) to support the reliable multicast service (e.g., by storing received multicast datagrams in a cache, by supporting retransmission requests, by forwarding multicast datagrams to other network elements and/or user devices, or the like).

As shown in FIG. 1B, and by reference number 130, the orchestration device may monitor the network elements and may detect an event. For example, the orchestration device may receive status information from one or more network elements that provide the reliable multicast service, and may detect an event that may warrant a modification of the reliable multicast service. For example, one or more network elements may provide status information to the orchestration device indicating a resource utilization, a rate of received multicast traffic, a rate of retransmission requests (e.g., to other network elements and/or from other network elements and/or user devices), a quantity of dropped multicast datagrams (e.g., from a retransmission cache), or the like.

The orchestration device may monitor the status information and may detect an event, such as a failure of a particular link, a utilization of a particular link satisfying a threshold, a resource utilization of a particular network element satisfying a threshold, a quantity of dropped multicast datagrams satisfying a threshold, or the like. Based on detecting an event, and as shown by reference number 140, the orchestration device may provide an instruction to modify the reliable multicast service. For example, the instruction may instruct a particular network element to increase a quantity of resources to be utilized to provide the reliable multicast service (e.g., to increase a cache size to support retransmission requests of multicast datagrams), to provide a different function in supporting the reliable multicast service, or the like.

Additionally, or alternatively, the instruction may instruct a particular network element to request to receive multicast datagrams from a different upstream network element (e.g., such that the forwarding characteristics of the network are changed). In this way, the orchestration device may initially configure the network elements to provide the reliable multicast service and may re-configure one or more network elements based on monitoring the network.

Implementations described herein may allow an orchestration device to configure network elements to provide a reliable multicast service based on historical information and/or based on identifying capabilities of the network elements and/or requirements of user devices associated with the network elements. In this way, network, memory, and/or processor resources may be conserved by allocating resources to particular network elements that may support the reliable multicast service.

Additionally, implementations described herein may allow an orchestration device to dynamically modify the reliable multicast service based on monitoring the network supporting the reliable multicast service. For example, the orchestration device may detect events that may result (or have resulted) in multicast datagram loss and/or retransmission requests for multicast datagrams. Further, the orchestration device may modify the reliable multicast service such that the quantity of retransmission requests and/or quantity of lost multicast datagrams is reduced, thereby conserving network, memory, and processor resources.

Additionally, the orchestration device may configure and/or re-configure the network elements such that the quantity of retransmission requests that are received by the multicast source are reduced, thereby increasing a multicast datagram forwarding rate and conserving network, memory, and processor resources.

As indicated above, FIGS. 1A and 1B are provided merely as an example. Other examples are possible and may differ from what was described with regard to FIGS. 1A and 1B.

Figure 2:
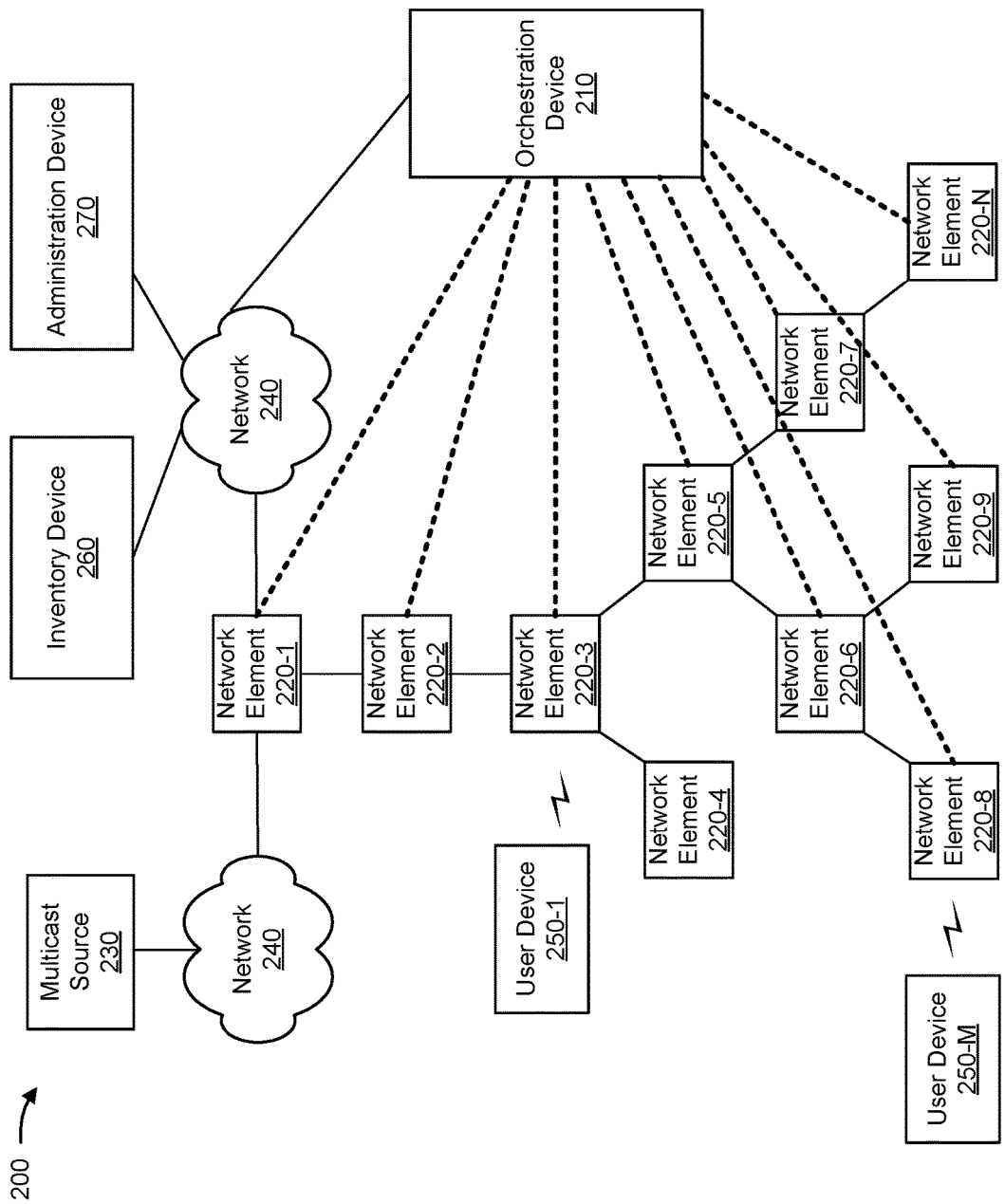
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an orchestration device 210, one or more network elements 220-1 through 220-N(N≥1) (hereinafter referred to collectively as "network elements 220," and individually as "network element 220"), a multicast source 230, a network 240, one or more user devices 250-1 through 250-M (M≥1) (hereinafter referred to collectively "user devices 250," and individually as "user device 250"), an inventory device 260, and an administration device 270. Devices of environment 200 may interconnect via wired connections, wireless connections, or a combination of wired and wireless connections.

Orchestration device 210 may include one or more devices capable of receiving, generating, storing, processing, and/or providing information associated with a reliable multicast service. Orchestration device 210 may include a computing device capable of receiving information from network elements 220 and/or providing information to network elements 220. In some implementations, orchestration device 210 may configure one or more network elements 220 to provide a reliable multicast service. In some implementations, orchestration device 210 may modify a reliable multicast service by providing instructions to one or more network elements 220 based on monitoring one or more network elements 220.

Network element 220 include one or more traffic transfer devices. For example, network element 220 may include a router, a switch, a firewall, a hub, a bridge, a gateway, a modem, a network interface card (NIC), an optical add-drop multiplexer (OADM), a reconfigurable optical add-drop multiplexer, a server, and/or another device capable of transmitting, receiving, transferring, and/or processing network traffic. In some implementations, network element 220 may receive multicast datagrams from multicast source 230 and/or another network element 220. In some implementations, network element 220 may store multicast datagrams in a cache and may forward multicast datagrams to another network element 220 and/or to user device 250. In some implementations, network element 220 may provide support for the reliable multicast service based on a configuration by orchestration device 210. In some implementations, network element 220 may be a standalone device. Additionally, or alternatively, network element 220 may include a virtual environment model executing on hardware. As used herein, traffic may refer to communication of information (e.g., via a packet) between network elements 220.

Multicast source 230 may include one or more devices capable of receiving, generating, storing, processing, and/or providing multicast content. For example, multicast source 230 may include a computing device, such as a server (e.g., a web server, a proxy server, a content server, etc.), or a similar device. In some implementations, multicast source 230 may provide multicast datagrams to a particular network element 220 (or network elements 220) and/or may receive retransmission requests from a particular network element 220 (or network elements 220).

Network 240 may include one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. In some implementations, network elements 220 may be included in network 240.

User device 250 may include one or more devices capable of receiving, generating, storing, processing, and/or providing information associated with a reliable multicast service. For example, user device 250 may include a mobile phone (e.g., a smart phone, a radiotelephone, etc.), a tablet computer, a handheld computer, a laptop computer, a desktop computer, a wearable communication device (e.g., a smart wristwatch, a pair of smart eyeglasses, etc.), a set-top box, a Machine-to-Machine (M2M) device, or a similar device. Additionally, user device 250 may include any device with a processor, a memory, and a communication device. For example, user device 250 may be any "thing" in the Internet of Things (IoT).

Inventory device 260 may include one or more devices capable of receiving, generating, storing, processing and/or providing information associated with an infrastructure and/or a topology of network 240. In some implementations, inventory device 260 may generate, store, process, and/or provide information identifying interconnections between network elements 220, a capacity of interconnecting links, and/or particular services capable of being supported by network elements 220. As used herein, a link may refer to a physical or logical connection between two or more network elements 220.

Administration device 270 may include one or more devices capable of receiving, generating, storing, processing and/or providing information associated with an administration and/or an operation of a reliable multicast service. In some implementations, administration device 270 may generate, store, process, and/or provide statistical information (e.g., in a data structure) associated with a reliable multicast service.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
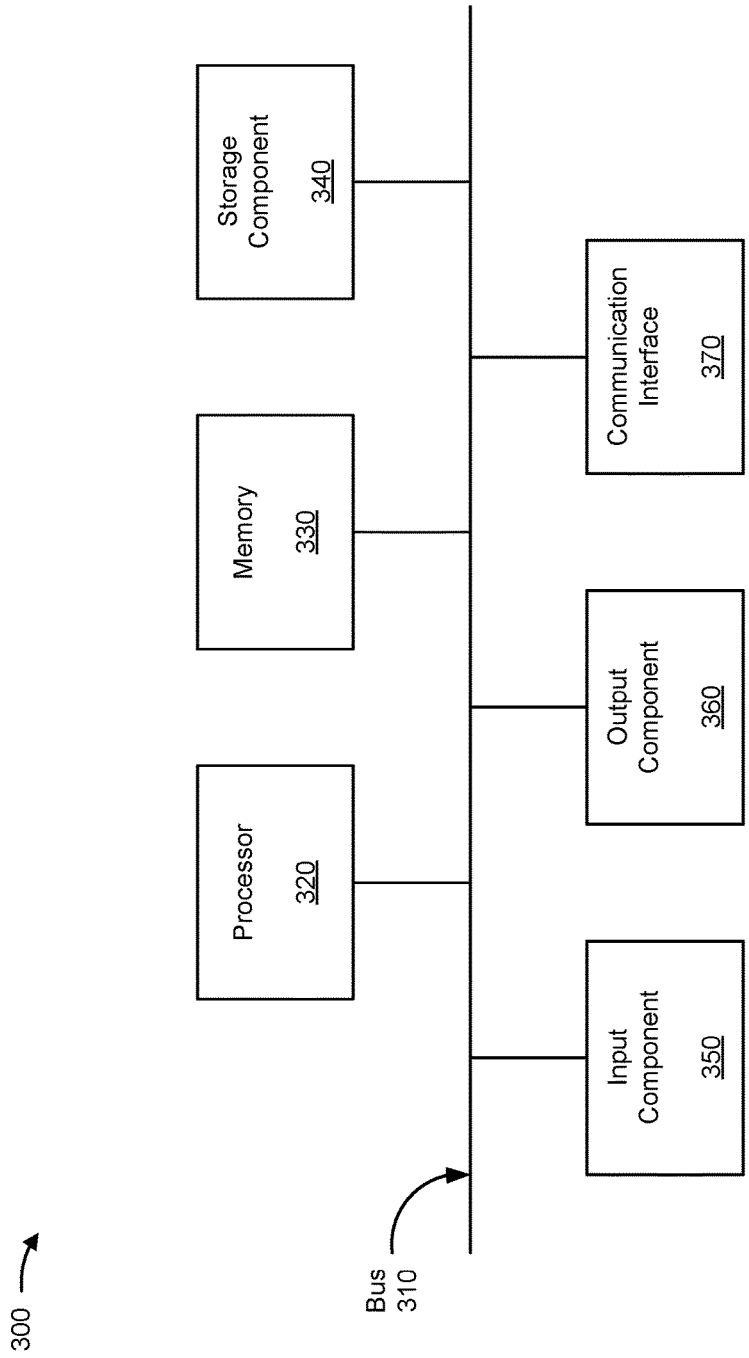
FIG. 3 is a diagram of example components of one or more devices of FIG. 2.

FIG. 3 is a diagram of example components of a device 300. Device 300 may correspond to orchestration device 210, network element 220, multicast source 230, user device 250, inventory device 260, and/or administration device 270. In some implementations, orchestration device 210, network element 220, multicast source 230, user device 250, inventory device 260, and/or administration device 270 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of non-transitory computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
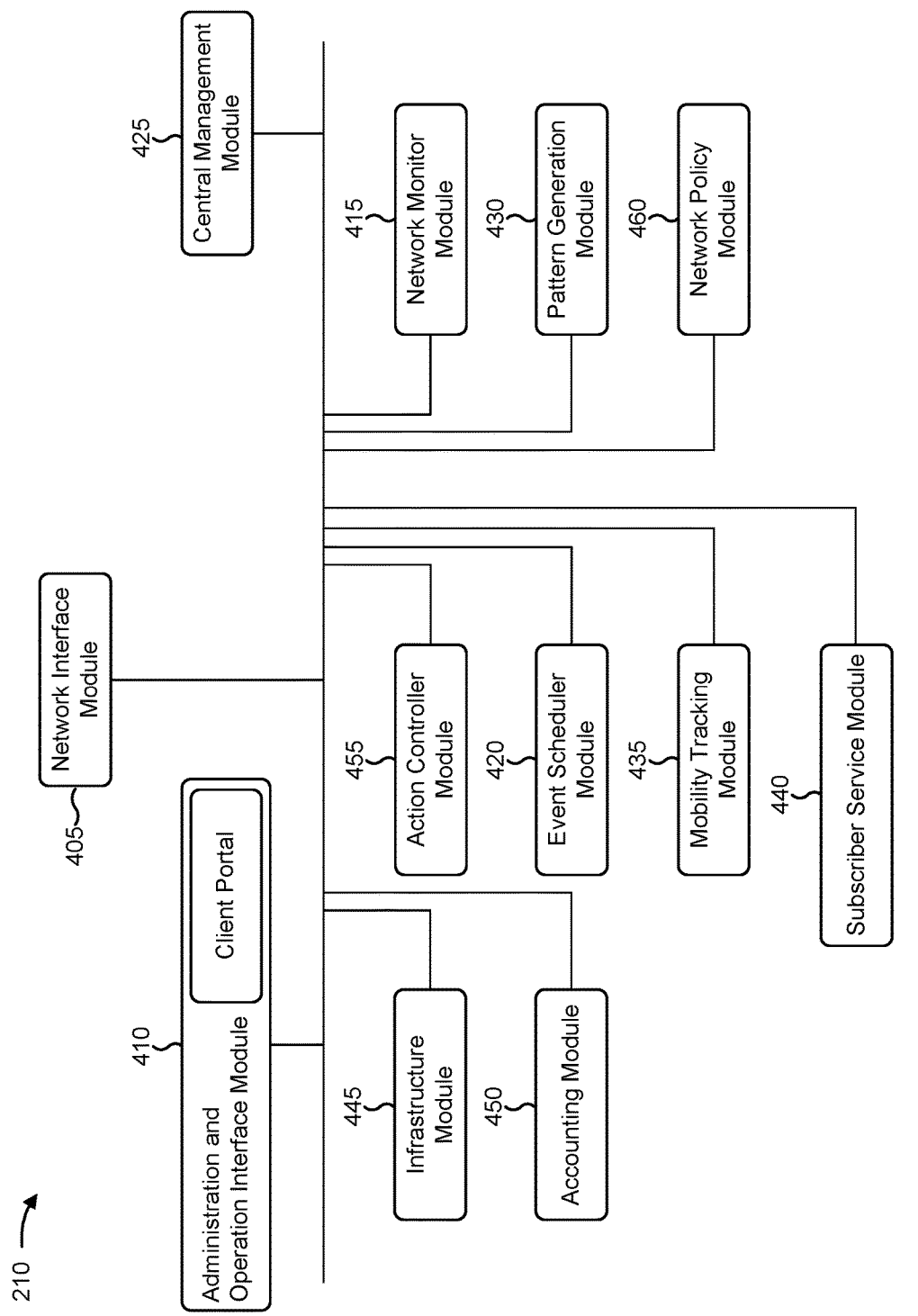
FIG. 4 is a diagram of example components of one or more devices of FIG. 2.

FIG. 4 is a diagram of example modules of orchestration device 210. As shown in FIG. 4, orchestration device 210 may include a network interface module 405, an administration and operation interface module 410, a network monitor module 415, an event scheduler module 420, a central management module 425, a pattern generation module 430, a mobility tracking module 435, a subscriber service module 440, an infrastructure module 445, an accounting module 450, an action controller module 455, and a network policy module 460. As used herein, the term module is intended to be broadly construed as hardware, firmware, or a combination of hardware and software.

Network interface module 405 may include a module that enables communication between orchestration device 210 and network elements 220. For example, network interface module 405 may enable communication between orchestration device 210 and a component of network element 220, as described elsewhere herein.

Administration and operation interface module 410 may include a module that enables communication between orchestration device 210 and administration device 270. In some implementations, administration and operation interface module 410 may receive information via a client portal (e.g., an electronic gateway). For example, a reliable multicast subscriber, customer, etc. may access a client portal and may provide information via the client portal (e.g., information scheduling a reliable multicast session (e.g., a teleconference, a video webcast, or the like)). In some implementations, a subscriber, customer, etc. may provide information associated with the scheduled reliable multicast session (e.g., information identifying a requested bandwidth, a requested multicast source 230, a start and end time for the session, or the like). Administration and operation interface module 410 may receive the information from the client portal and may provide the information to event scheduler module 420, in some implementations.

Network monitor module 415 may include a module that receives, generates, stores, processes, provides, and/or monitors information associated with a reliable multicast service. In some implementations, network monitor module 415 may monitor requests by user devices 250 to receive datagrams associated with multicast source 230.

Event scheduler module 420 may include a module that receives, generates, stores, processes, and/or provides pre-scheduled reliable multicast session information. For example, event scheduler module 420 may receive information associated with pre-scheduled reliable multicast sessions. In some implementations, administration and operation interface module 410 may provide event scheduler module 420 with information associated with a pre-scheduled reliable multicast session (e.g., a requested bandwidth, a requested start date, a requested start time, a requested end date, a requested end time, etc.). Event scheduler module 420 may identify the information and may allocate resources at the scheduled date and time, in some implementations.

Central management module 425 may include a module that synchronizes functions between modules associated with orchestration device 210.

Pattern generation module 430 may include a module that identifies services, events, and/or network patterns associated with a reliable multicast service. For example, pattern generation module 430 may receive, generate, store, process, and/or provide information associated with a reliable multicast service. In some implementations, pattern generation module 430 may include a data structure (e.g., a database, or the like) and may store information associated with a reliable multicast service. Pattern generation module 430 may analyze the information included in the data structure and may extract one or more patterns from the information (e.g., a pattern indicating that network traffic associated with a particular link increases by a particular bandwidth at a particular time and/or date, a pattern indicating that a particular user device 250 may request datagrams associated with a particular multicast source 230 at a particular time and/or date, or the like). In some implementations, pattern generation module 430 may extract one or more patterns and may identify potential instructions to provide to network elements 220 based on the one or more patterns.

Mobility tracking module 435 may include a module that receives, generates, stores, processes, and/or provides information associated with a location of one or more user devices 250.

Subscriber service module 440 may include a module that receives, generates, stores, processes, and/or provides information associated with a subscriber (e.g., a quality of service (QoS), a feature, and/or a capability associated with a reliable multicast service that the subscriber is entitled to receive based on a service contract, or the like). In some implementations, subscriber service module 440 may store information identifying occurrences that may result in a deviation from a service contract associated with a subscriber (e.g., a datagram loss rate satisfying a threshold, a delay for receiving a requested datagram satisfying a threshold, or the like). Additionally, or alternatively, subscriber service module 440 may store information identifying compensation that the subscriber may be entitled to receive based on a deviation from the service contract.

Infrastructure module 445 may include a module that receives, generates, stores, processes, and/or provides information associated with an infrastructure of network 240 (e.g., information associated with a topology of network 240, an infrastructure of network 240, capacities of one or more links associated with network 240, capabilities of network elements 220, or the like). In some implementations, infrastructure module 445 may update topology and/or infrastructure information based on topology and/or infrastructure changes associated with network 240.

Accounting module 450 may include a module that receives, generates, stores, processes, and/or provides information associated with accounting events. For example, a subscriber to a reliable multicast service may select to receive a particular QoS despite a particular network condition. In some implementations, accounting module 450 may receive, store, and/or provide information associated with a duration during which the subscriber receives the particular QoS despite the particular network condition.

Action controller module 455 may include a module that receives, generates, stores, processes, and/or provides information associated with instructions to one or more network elements 220. In some implementations, action controller module 455 may receive information, from network monitor module 415, event scheduler module 420, pattern generation module 430, and/or other modules, associated with one or more events associated with a reliable multicast service. Action controller module 455 may generate and/or provide an instruction to one or more network elements 220 based on receiving the information associated with one or more events associated with a reliable multicast service, in some implementations.

Network policy module 460 may include a module that receives, generates, stores, processes, and/or provides information associated with network policies regarding a reliable multicast service. For example, network policy module 460 may receive and/or store information associated a policy regarding usage of the infrastructure of network 240 to support a reliable multicast service (e.g., a bandwidth available to support a reliable multicast service, a quantity of network elements 220 available to support a reliable multicast service, a quantity of resources associated with one or more network elements 220 available to support a reliable multicast service, or the like).

The number and arrangement of components shown in FIG. 4 are provided as an example. In practice, orchestration device 210 may include additional modules, fewer modules, different modules, or differently arranged modules than those shown in FIG. 4. Additionally, or alternatively, a set of modules (e.g., one or more modules) of orchestration device 210 may perform one or more functions described as being performed by another set of modules of orchestration device 210.

Figure 5:
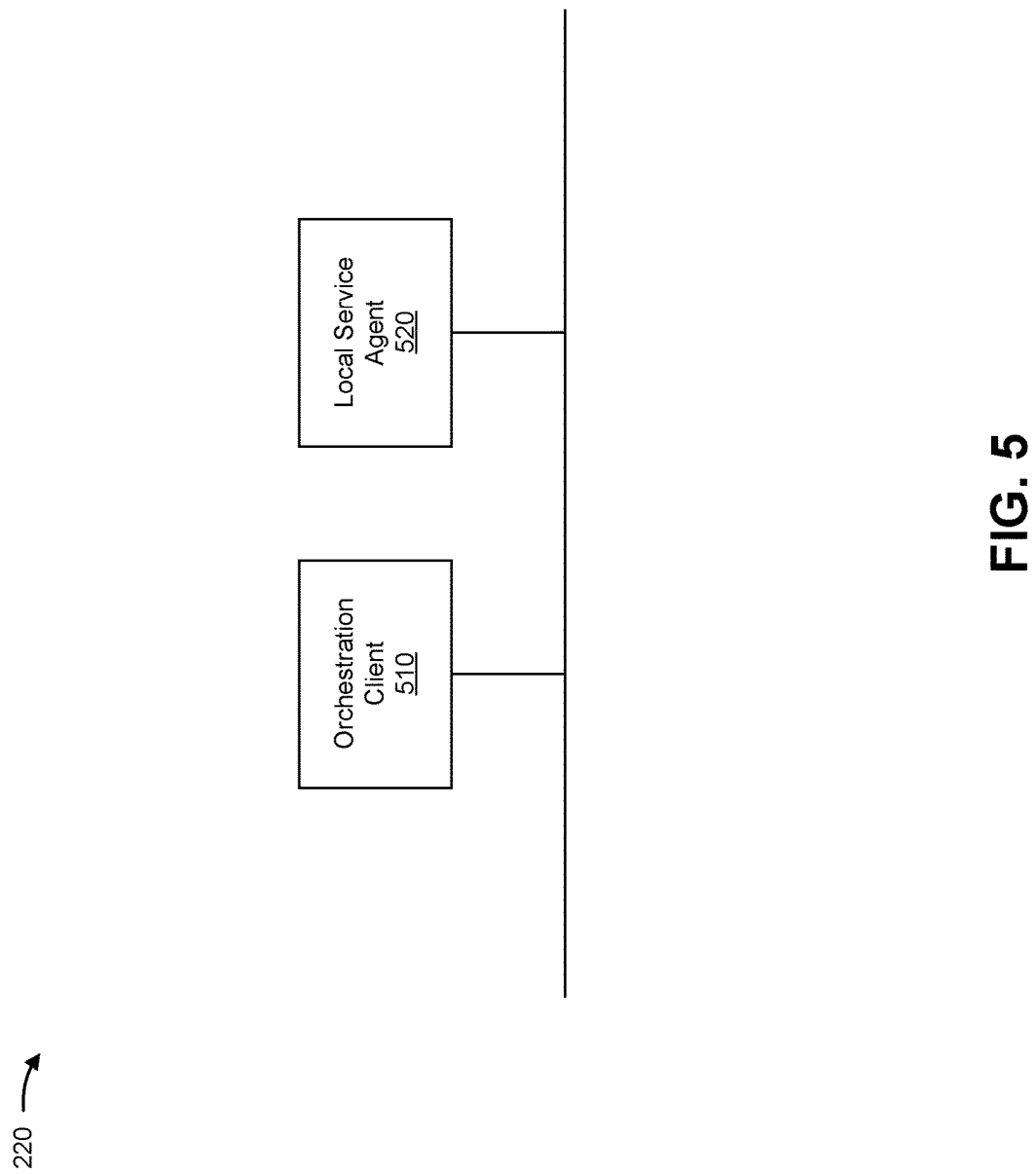
FIG. 5 is a diagram of example components of one or more devices of FIG. 2.

FIG. 5 is a diagram of example components of network element 220. As shown in FIG. 5, network element 220 may include an orchestration client 510 and a local service agent 520.

Orchestration client 510 may include a component that receives information from and/or provides information to orchestration device 210. For example, orchestration client 510 may receive an instruction and/or a request from orchestration device 210 and may provide a corresponding acknowledgement and/or response. In some implementations, orchestration client 510 may provide orchestration device 210 with information associated with an event associated with a reliable multicast service (e.g., a status of network elements 220, or the like). Orchestration client 510 may receive an instruction from orchestration device 210 and may provide the instruction to local service agent 520, in some implementations.

Local service agent 520 may include a component that participates in a reliable multicast service delivery process (e.g., receives multicast datagrams, maintains multicast datagrams in a cache, and/or forwards multicast datagrams to other network elements 220 and/or user devices 250). In some implementations, local service agent 520 may include a particular functionality. For example, orchestration device 210 may assign a functionality, and/or a subset of functionalities, to local service agent 520.

For example, local service agent 520 may interact (e.g., receive datagrams and/or request retransmission of datagrams) with multicast source 230, in some implementations. Additionally, or alternatively, local service agent 520 may forward multicast datagrams to other network elements 220 and/or user devices 250, and/or may request retransmission of multicast datagrams from other network elements 220. In some implementations, local service agent 520 may support retransmission requests (e.g., from other network elements 220 and/or user devices 250) based on stored information (e.g., information associated with a datagram stored in a cache, or the like).

In some implementations, local service agent 520 may aggregate membership reports (e.g., requests to receive multicast traffic from multicast source 230) received from other network elements 220 and/or user devices 250 (e.g., downstream network elements 220, that are further from multicast source 230, and/or user devices 250). Additionally, local service agent 520 may forward membership reports to other network elements 220 (e.g., upstream network elements 220 that are closer to multicast source 230).

In some implementations, local service agent 520 may support all or a subset of the functions described above based on configuration information received from orchestration device 210. Additionally, orchestration device 210 may re-configure one or more network elements 220 to support all or a subset of the functions described above based on monitoring the reliable multicast service, as described elsewhere herein.

The number and arrangement of components shown in FIG. 5 are provided as an example. In practice, network element 220 may include additional components, fewer components, different components, or differently arranged components than those shown in FIG. 5. Additionally, or alternatively, a set of components (e.g., one or more components) of network element 220 may perform one or more functions described as being performed by another set of components of network element 220.

Figure 6:
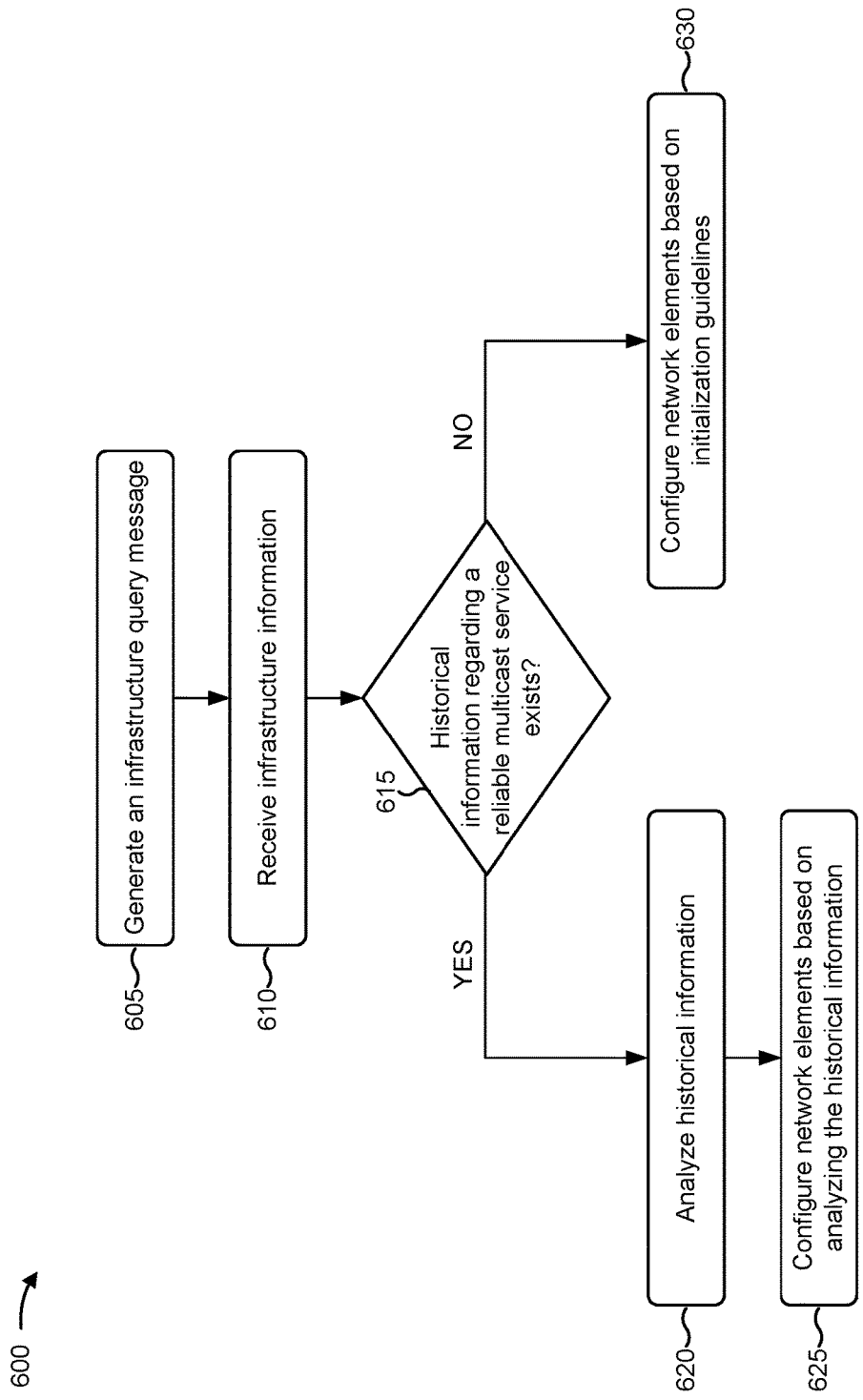
FIG. 6 is a flow chart of an example process for initializing a network to support a reliable multicast service.

FIG. 6 is a flow chart of an example process 600 for initializing a network to support a reliable multicast service. In some implementations, one or more process blocks of FIG. 6 may be performed by orchestration device 210. In some implementations, one or more process blocks of FIG. 6 may be performed by another device or a group of devices separate from or including orchestration device 210, such as network element 220, multicast source 230, user device 250, inventory device 260, and/or administration device 270.

As shown in FIG. 6, process 600 may include generating an infrastructure query message (block 605). For example, orchestration device 210 may generate an infrastructure query message and may provide the infrastructure query message to inventory device 260. In some implementations, orchestration device 210 may generate the infrastructure query message based on an initial creation of a reliable multicast network, based on a change to the reliable multicast network, based on a failure of one or more network elements 220, and/or the like.

As further shown in FIG. 6, process 600 may include receiving infrastructure information (block 610). For example, inventory device 260 may provide orchestration device 210 with infrastructure information based on receiving the infrastructure query message. In some implementations, orchestration device 210 may receive information that identifies types of network elements 220 available in the reliable multicast network (e.g., routers, switches, gateways, servers, hubs, etc.), a quantity of network elements 220 (e.g., of each type) available in the reliable multicast network, a capability of network elements 220 (e.g., bandwidth capabilities, a quantity of user devices 250 capable of being served by one or more network elements 220, etc.), a quantity of resources available for network elements 220 (e.g., CPU resources, memory resources, etc.), a geographic location of network elements 220, capacities of interconnections between network elements 220 (e.g., link bandwidth capacities, etc.), or the like.

In some implementations, orchestration device 210 may receive infrastructure information identifying available resources, associated with network elements 220, to provide the reliable multicast service (e.g., a quantity of resources available on network elements 220 to provide the reliable multicast service, or the like). For example, the quantity of resources available on a particular network element 220 to support the reliable multicast service may be less than a total quantity of available resources on the particular network element 220.

As further shown in FIG. 6, process 600 may include determining whether historical information regarding the reliable multicast service exists (block 615). For example, orchestration device 210 may determine whether historical information regarding the reliable multicast service exists (e.g., in a data structure, via pattern generation module 430, etc.).

As further shown in FIG. 6, if historical information regarding the reliable multicast service exists (block 615—YES), then process 600 may include analyzing historical information associated with the reliable multicast service (block 620). For example, orchestration device 210 (e.g., via pattern generation module 430) may analyze the historical information regarding the reliable multicast service and may configure network elements 220 based on analyzing the historical information, as described below.

For example, orchestration device 210 (e.g., via pattern generation module 430) may store information (e.g., in a data structure, such as a database) associated with multicast traffic, requested and/or received by user devices 250, associated with the reliable multicast service. Additionally, orchestration device 210 may store information identifying particular times, durations, dates, etc. that user devices 250 requested and/or received multicast traffic associated with the reliable multicast service. Additionally, or alternatively, orchestration device 210 may store information identifying particular service areas (e.g., associated with one or more network elements 220) where user devices 250 requested and/or received multicast traffic associated with the reliable multicast service.

In some implementations, network elements 220 (e.g., via local service agent 520) may provide orchestration device 210 (e.g., pattern generation module 430) with information identifying received rates (e.g., maximum rates, average rates, or the like) of multicast traffic, received retransmission request rates (e.g., from other network elements 220 and/or user devices 250), retransmission rates (e.g. to other network elements 220 and/or user devices 250), or the like. In some implementations, network elements 220 may provide orchestration device 210 with information identifying particular resource (e.g., CPU, memory, etc.) settings and/or resource utilization values, which may be time correlated with the aforementioned statistics (e.g., rates, etc.).

As further shown in FIG. 6, process 600 may include configuring network elements based on analyzing the historical information (block 625). For example, orchestration device 210 may configure network elements 220 to provide the reliable multicast service based on analyzing the historical information. For example, orchestration device 210 may assign one or more functions to one or more network elements 220. For example, orchestration device 210 may configure one or more network elements 220 to interact with multicast source 230 (e.g., receive multicast datagrams, request retransmission of multicast datagrams, etc.), may configure one or more network elements 220 to support the reliable multicast service (e.g., forward multicast datagrams to other network elements 220 and/or user devices 250, store multicast datagrams in a cache, support retransmission requests from other network elements 220 and/or user devices 250, or the like), may configure resources (e.g., CPU, memory, etc.) on one or more network elements 220 to support the reliable multicast service, or the like.

By configuring network elements 220 based on analyzing historical information, orchestration device 210 may identify particular network elements 220 to support the reliable multicast service such that the potential for datagram loss, datagram retransmission requests, or the like, is minimized. For example, orchestration device 210 may allocate additional resource and/or may assign a particular function to one or more network elements 220 that are associated with unreliable links and/or are associated with particular user devices 250 (e.g., associated with higher retransmission requests).

As further shown in FIG. 6, if historical information regarding the reliable multicast service does not exist (block 615—NO), then process 600 may include configuring network elements based on initialization guidelines (block 630). For example, orchestration device 210 may configure network elements 220 to provide the reliable multicast service based on initialization guidelines. In some implementations, the initialization guidelines may include information indicating a maximum quantity of upstream hops that a request for multicast traffic (e.g., a membership report) may be forwarded before reaching a particular network element 220 that interacts with multicast source 230 and/or before reaching a network element 220 that supports retransmission of multicast datagrams, or the like.

Additionally, or alternatively, the initialization guidelines may include information indicating a maximum quantity of multicast sources with which a particular network element 220 may interact (e.g., receive datagrams and/or request retransmission of datagrams), a maximum quantity of multicast groups (e.g., associated with different multicast sources 230) for which a particular network element 220 may support retransmission of multicast datagrams, or the like. Additionally, or alternatively, the initialization guidelines may include information specifying initial values for CPU and/or memory resources for network elements 220 (e.g., 80% of maximum values allocable to support reliable multicast, or the like).

Orchestration device 210 may configure one or more network elements 220 based on the initialization guidelines by assigning one or more functions, as described above in connection with block 625, to one or more network elements 220.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
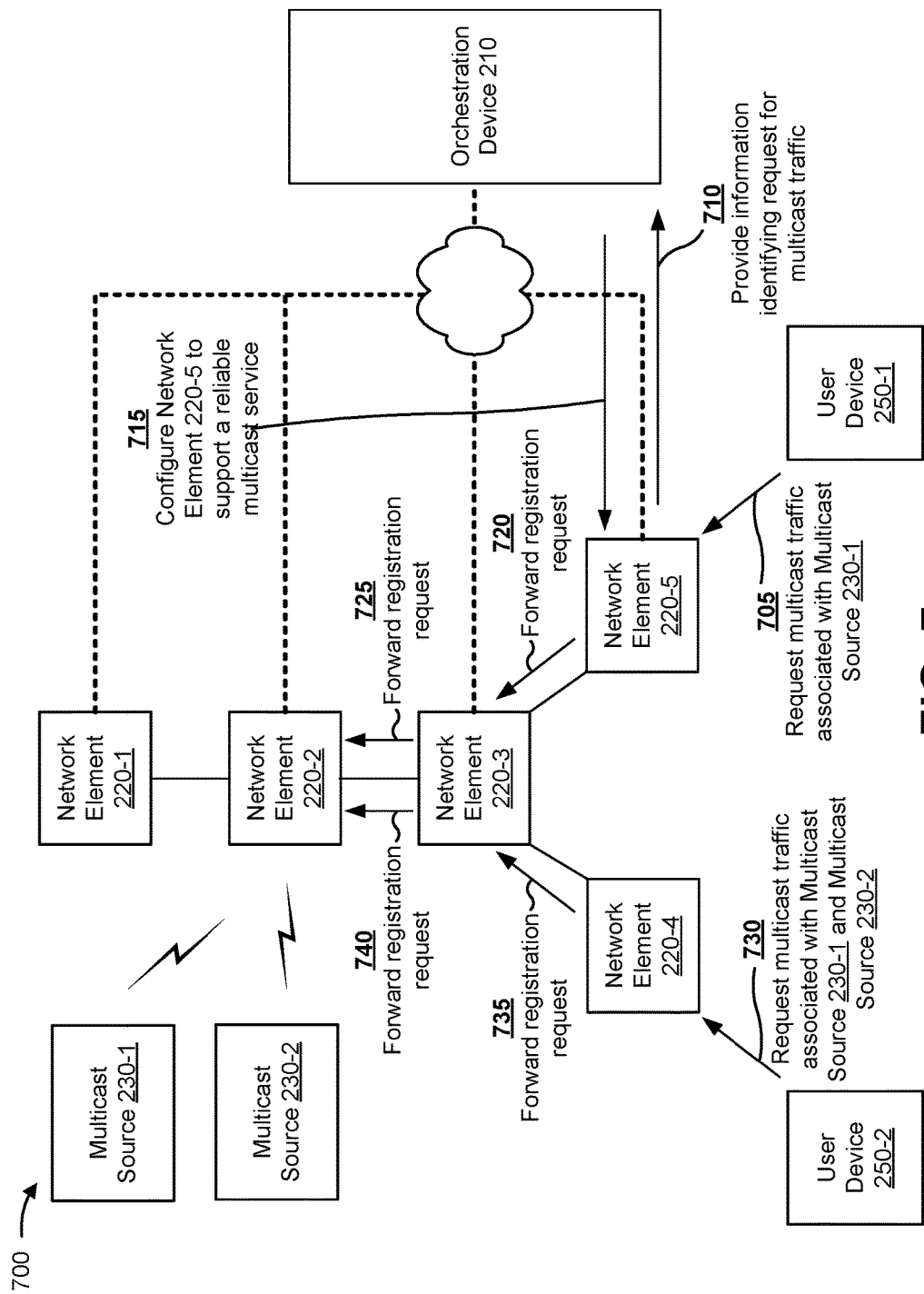
FIG. 7 is a diagram of an example implementation for processing registration requests for multicast traffic.

FIG. 7 is a diagram of an example implementation for processing registration requests for multicast traffic. As shown in FIG. 7, and by reference number 705, user device 250-1 may request multicast traffic associated with multicast source 230-1 by providing network element 220-5 with a registration request message, as shown in more detail in association with FIG. 8. In some implementations, network element 220-5 may receive, from user device 250-1, a registration request message including a request for local registration and/or a request for one or more requested multicast groups (e.g., associated with one or more multicast sources 230).

In some implementations, user device 250-1 may provide network element 220-5 with a registration request based on a particular protocol (e.g., Internet Group Management Protocol (IGMP), Mobile IP, or the like). In some implementations, network element 220-5 may determine whether the registration request is associated with a stationary user device 250 (e.g., a particular user device 250 that may not move to another service area (e.g., associated with another network element 220) while the reliable multicast service is being provided) or a mobile user device 250 (e.g., a particular user device 250 that may move to another service area while the reliable multicast service is being provided). If network element 220-5 determines that user device 250-1 is a mobile user device 250, network element 220-5 may conduct mobility management procedures.

In some implementations, network element 220-5 may identify a multicast extension in the registration request message and may determine whether multicast traffic associated with multicast source 230-1 is being received by network element 220-5. If network element 220-5 determines that multicast traffic associated with multicast source 230-1 is being received, then network element 220-5 may determine whether network element 220-5 is interacting with multicast source 230 (e.g., receiving datagrams and requesting retransmission of datagrams), supporting retransmissions of datagrams, forwarding multicast datagrams, or the like. If network element 220-5 determines that network element 220-5 is interacting with multicast source 230-1 and/or is supporting retransmission of multicast datagrams, then network element 220-5 may register user device 250-1 as a member to receive multicast traffic associated with multicast source 230-1, and may monitor reliable delivery of multicast traffic to user device 250-1, as described elsewhere herein.

In some implementations, network element 220-5 may forward the registration request to another network element 220 (e.g., an upstream network element 220, such as network element 220-3). For example, if network element 220-5 determines that network element 220-5 is forwarding multicast datagrams and is not supporting retransmission requests, then network element 220-5 may register user device 250-1 to receive multicast traffic associated with source 230 and may forward the registration request to another network element 220 (e.g., network element 220-3). Additionally, or alternatively, if network element 220-5 is not receiving multicast traffic associated with multicast source 230-1, then network element 220-5 may forward the registration request to another network element 220 (e.g., network element 220-3).

For example, as shown in FIG. 7, network element 220-5 may receive the registration request message, including the multicast extension for multicast traffic associated with multicast source 230-1, from user device 250-1. For example, at the time network element 220-5 receives the registration request from user device 250-1, assume that network element 220-5 is not supporting reliable multicast service for traffic associated with multicast source 230-1. As shown by reference number 710, network element 220-5 may provide orchestration device 210 with information identifying the registration request message. For example, orchestration device 210 may receive information from network element 220-5, and as shown by reference number 715, orchestration device 210 may configure network element 220-5 to support a reliable multicast service associated with multicast source 230-1 (e.g., may activate a function associated with local service agent 520). As shown by reference number 720, network element 220-5 may forward the registration request message upstream (e.g., to network element 220-3).

For example, assume that network element 220-3 is not supporting reliable multicast service associated with multicast source 230-1 when network element 220-3 receives the registration request message from network element 220-5. Network element 220-3 may perform a similar action as network element 220-5 (e.g., may provide information to orchestration device 210 and may receive configuration information from orchestration device 210). As shown by reference number 725, network element 220-3 may forward the registration request message to network element 220-2, for example.

In some implementations, the registration request may travel upstream until the registration request is received by a particular network element 220 that is interacting with multicast source 230-1 and/or is supporting retransmission requests. For example, as the registration request travels upstream, other membership reports (e.g., associated with the same multicast source 230) may be aggregated. In this way, the quantity of membership reports may be reduced, thereby conserving network resources.

For example, as shown in FIG. 7, assume that network element 220-2 is interacting with multicast source 230-1 (e.g., receiving multicast datagrams, requesting multicast datagrams, etc.). Network element 220-2 may not need to forward the registration request message to other upstream network elements 220 (e.g., based on network element 220-2 interacting with multicast source 230).

As shown in FIG. 7, and by reference number 730, assume that user device 250-2 provides network element 220-4 with a registration request message including requests to receive multicast traffic associated with multicast source 230-1 and multicast source 230-2. Further, assume that user device 250-2 provides the registration request message to network element 220-4 after network element 220-3 has been configured to support reliable multicast service for multicast traffic associated with multicast source 230-1. Network element 220-4 may perform a similar process as described above (e.g., notify orchestration device 210 of the registration request message, forward the registration request message to network element 220-3, etc.). For example, as shown by reference number 735, network element 220-4 may forward the registration request message to network element 220-3.

Network element 220-3 may receive the registration request message from network element 220-4 and may determine that network element 220-3 is already supporting a reliable multicast service associated with multicast source 230-1. Additionally, assume that network element 220-3 is not supporting a reliable multicast service associated with multicast source 230-2. As shown by reference number 740, network element 220-3 may forward the registration request message to network element 220-2, including only the registration request for multicast source 230-2 (e.g., based on network element 220-3 not supporting reliable multicast service associated with multicast source 230-2 at the time of the request and based on network element 220-3 supporting reliable multicast service associated with multicast source 230-1 at the time of the request). In this way, network elements 220 may conserve network resources by refraining from transmitting unnecessary registration requests.

As indicated above, FIG. 7 is provided merely as an example implementation of processing registration requests for multicast traffic. Other examples are possible and may differ from what was described with regard to FIG. 7.

FIG. 8 is an example format 800 for a registration request message. As shown in FIG. 8, the registration request message may include a multicast group membership report that may be embedded within a regional registration request, where the multicast group membership report may be treated as an extension. In this way, multiple multicast groups (e.g., associated with multiple multicast sources 230) may be requested in a particular registration message.

As shown in FIG. 8, a field associated with reserved bits (e.g., shown as "rsv") may be used to indicate whether user device 250 is mobile or stationary. For example, a sequence "01" may designate a mobile user device 250 and a sequence "10" may indicate a stationary user device 250, for example. In instances where user device 250 is mobile, fields indicating a home address, a home agent, a care-of address, or the like may be populated. Alternatively, if user device 250 is stationary, a home address field may be populated and fields corresponding to a home agent and a care-of address may be set to zero. In some implementations, the hierarchical foreign agent extension may be added if user device 250 is mobile.

In some implementations, one or more extensions (e.g., including IP addresses associated with multicast groups that may correspond to multicast sources 230) may be added based on the quantity of requested multicast groups. In some implementations, a field associated with reserved bits (e.g., shown as "rsvd") may be populated with a value (e.g., "1") to indicate that a reliable multicast service is requested for traffic associated with multicast source 230 (e.g., "group G1," "group G2," or the like). Alternatively, another value (e.g., "0") may indicate that reliable multicast service is not requested for traffic associated with multicast source 230.

Although FIG. 8 shows an example format for a registration request message, in some implementations, a registration request message may include additional fields, fewer fields, different fields, or differently arranged fields than those depicted in FIG. 8.

Figure 9:
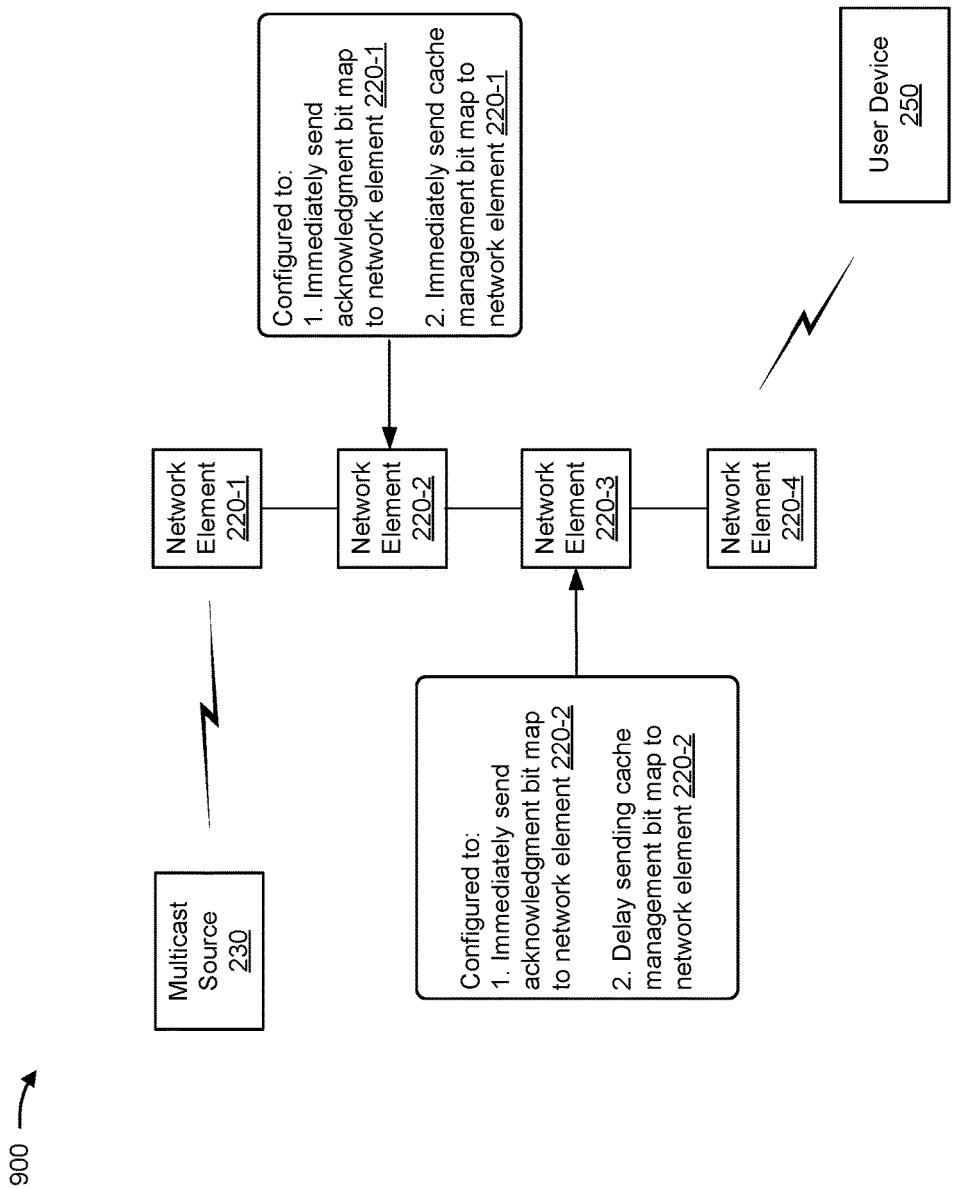
FIG. 9 is a diagram of an example implementation for forwarding and supporting retransmission of multicast datagrams.

FIG. 9 is a diagram of an example implementation 900 for forwarding and supporting retransmission of multicast datagrams. As shown in FIG. 9, network element 220-1 may interact with multicast source 230 (e.g., may receive multicast datagrams and/or may request retransmission of multicast datagrams). In some implementations, multicast source 230 may assign each transmitted multicast datagram a sequence number. Network element 220-1 may detect a missing datagram based on the sequence number(s), and may request retransmission of the missing datagram, in some implementations.

For example, network element 220-1 may store information identifying user devices 250 registered with network element 220-1 to receive multicast datagrams, and/or other network elements 220 (e.g., network element 220-2, 220-3, 220-4, etc.) that are registered to receive multicast datagrams from network element 220-1. Based on retransmission requests from user devices 250 and/or other network elements 220, network element 220-1 may request multicast source 230 to retransmit the requested datagram(s).

In some implementations, network element 220-1 may receive, from multicast source 230, a datagram including a sequence number. Based on receiving the multicast datagram, network element 220-1 may inspect the sequence number and may generate an acknowledgment or may generate a retransmission request. In some implementations, network element 220-1 and other network elements 220 (e.g., network elements 220 supporting retransmission requests by storing datagrams in a cache) may cooperate to compensate for missing datagrams. In this way, the quantity of retransmission requests provided to multicast source 230 may be reduced, thereby conserving network resources, and conserving processor and memory resources associated with multicast source 230 and/or network elements 220.

Based on receiving a multicast datagram, network element 220-1 may store a copy of the multicast datagram in a cache until network element 220-1 receives a notification to remove the multicast datagram, as described below. In some implementations, network element 220-1 may generate a sequence number (e.g., different than the sequence number provided by multicast source 230) for the multicast datagram and may map the generated sequence number to a sequence number provided by multicast source 230. Alternatively, network element 220-1 may use the sequence number provided by multicast source 230.

In some implementations, network element 220-1 may provide the multicast datagram to other network elements 220 and/or user devices 250. For example, network element 220-1 may determine (e.g., from a data structure) other network elements 220 and/or user devices 250 that are registered to receive multicast traffic associated with multicast source 230. Network element 220-1 may update the data structure to include information identifying multicast datagrams (e.g., based on sequence numbers) delivered to and/or acknowledged by other network elements 220 and/or user devices 250, for example.

In some implementations, a particular network element 220 may indicate to other network elements 220 (e.g., upstream network elements 220) that network element 220 has received a particular multicast datagram and/or may request retransmission of a particular datagram. Additionally, user device 250 may indicate to a particular network element 220 (e.g., network element 220 providing multicast datagrams to user device 250) that user device 250 has received a particular datagram and/or may request retransmission of a particular datagram.

In some implementations, network element 220 may receive a message from another network element 220 and/or user device 250 indicating a missing multicast datagram. Network element 220 may retransmit the missing multicast datagram if network element 220 has a copy (e.g., stored in a cache). Alternatively, network element 220 may transmit a retransmission request including information indicating a sequence number of the requested multicast datagram (e.g., to upstream network elements 220 and/or multicast source 230). In some implementations, network elements 220 and/or user devices 250 may provide an aggregated retransmission request and/or an expedited retransmission request.

In some implementations, network element 220 may store a bit map for sequence numbers associated with missing multicast datagrams, which may be updated based on receiving acknowledgment messages from user devices 250 (e.g., in a service area associated with network element 220) and/or from other network elements 220 (e.g., downstream network elements 220). Each acknowledgment message may include information identifying requested and/or last received datagram sequence numbers, and may serve as a retransmission request for missing datagrams, in some implementations. For example, the acknowledgement message, including an embedded retransmission request, may be sent based on receiving a particular quantity of multicast datagrams from network element 220 (e.g., an upstream network element 220). In some implementations, a timer including an expiration value that depends on the rate of receiving multicast traffic may trigger generation of the acknowledgment message.

In some implementations, user device 250 may provide an immediate retransmission request based on using an expedited retransmission flag. For example, if user device 250 detects a missing datagram (e.g., packet loss) based on moving into a new service area, then user device 250 may provide network element 220 (e.g., associated with the new service area) with a registration message including a retransmission request including an expedited retransmission flag. For example, orchestration device 210 may enable network element 220 to provide an immediate retransmission of the requested multicast datagram based on an expedited retransmission flag. A particular network element 220 that is responding to the retransmission request may receive the retransmission request and may retransmit the requested datagram via unicast to another network element 220 (e.g., the network element 220 associated with the new service area) based on the expedited retransmission flag. For example, the packet sent via unicast may include a destination field that is set to the address associated with the particular network element 220 that is associated with the new service area.

Alternatively, if the expedited flag is disabled (e.g., indicating an aggregated request), the particular network element 220 responding to the retransmission request may retransmit the requested datagrams to network element 220 (e.g., a downstream network element 220) that forwarded the request. In some implementations, the expedited retransmission request may reduce a delay in receiving missing datagrams based on mobility events.

In some implementations, network elements 220 and/or user devices 250 may provide an acknowledgement message including an acknowledgement bit map and/or a cache management bit map. For example, the acknowledgement bit map may serve as an indication for successfully received multicast datagrams and/or for requested sequence numbers. The cache management bit map may serve as an indication that a particular datagram may be removed from a cache (e.g., a cache associated with a particular network element 220 that provided the multicast datagram). In some implementations, acknowledgement messages may be aggregated as the acknowledgement messages travel upstream.

In some implementations, orchestration device 210 may configure network elements 220 to provide a particular acknowledgement message based on monitoring a status of the reliable multicast network (e.g., resource utilization, a quantity of available resources, retransmission statistics, mobility of user devices 250, etc.). For example, orchestration device 210 may configure one or more network elements 220 to provide either an immediate or delayed acknowledgement bit map and/or cache management bit map. Providing an immediate acknowledgment bit map may result in a higher datagram forwarding rate, in some implementations. Alternatively, providing a delayed acknowledgment bit map may reduce a quantity of signaling and may reduce the need for multiple retransmissions for the same multicast datagram. In some implementations, providing an immediate cache management bit map may allow an upstream network element 220 to preserve resources (e.g., by removing multicast datagrams from a cache). Alternatively, providing a delayed cache management bit map may increase the likelihood of identifying a copy of a missing multicast datagram. For example, orchestration device 210 may configure particular network elements 220 to provide a delayed cache management bit map based on determining that a particular quantity of user devices 250 that are mobile are receiving multicast traffic and/or based on determining that particular links are unreliable. In this way, the likelihood of identifying a copy of a missing multicast datagram may be enhanced.

For example, as shown in FIG. 9, assume that orchestration device 210 has configured network element 220-2 to provide an immediate cache management bit map to network element 220-1. For example, orchestration device 210 may determine that network element 220-1 may have a limited quantity of available resources (e.g., memory resources) to support retransmission requests from other network elements 220 and/or user devices 250. Further, assume that orchestration device 210 determines that network element 220-2 has available resources to support retransmission of multicast datagrams.

For example, assume that orchestration device 210 configures network element 220-2 to provide an immediate acknowledgement bit map and a cache management bit map. Network element 220-2 may receive a multicast datagram from network element 220-1 and may immediately provide an acknowledgment bit map and a cache management bit map to network element 220-1. Based on receiving the acknowledgement bit map and the cache management bit map, network element 220-1 may remove the particular multicast datagram from a cache associated with network element 220-1.

As further shown in FIG. 9, assume that orchestration device 210 determines that network element 220-3 and network element 220-4 have limited resources to support retransmission of multicast datagrams. Orchestration device 210 may configure network element 220-3 and network element 220-4 to provide a delayed cache management bit map. For example, network element 220-3 may receive a multicast datagram from network element 220-2 and may immediately provide an acknowledgement bit map to network element 220-2, and may delay in providing a cache management bit map to network element 220-2. In this way, network element 220-2 and network element 220-3 may store the multicast datagram (e.g., in respective caches).

Network element 220-4 may receive the multicast datagram from network element 220-3 and may provide network element 220-3 with an acknowledgment bit map, and may delay in providing a cache management bit map to network element 220-3. Network element 220-4 may provide the multicast datagram to user device 250, and may receive an acknowledgment bit map and a cache management bit map from user device 250. Based on receiving the acknowledgment bit map from user device 250, network element 220-4 may remove the multicast datagram (e.g., from a cache associated with network element 220-4), and may provide network element 220-3 with a cache management bit map (e.g., associated with the multicast datagram). Further, network element 220-3 may remove the multicast datagram (e.g., from a cache associated with network element 220-3), and may provide network element 220-2 with a cache management bit map (e.g., associated with the multicast datagram). Based on receiving the cache management bit map from network element 220-3, network element 220-2 may remove the multicast datagram (e.g., from a cache associated with network element 220-2). In this way, orchestration device 210 may instruct network elements 220 to provide either immediate or delayed cache management bit maps, such that the quantity of retransmission requests to multicast source 230 is reduced.

As indicated above, FIG. 9 is provided merely as an example implementation of forwarding and supporting retransmission of multicast datagrams. Other examples are possible and may differ from what was described with regard to FIG. 9.

Figure 10:
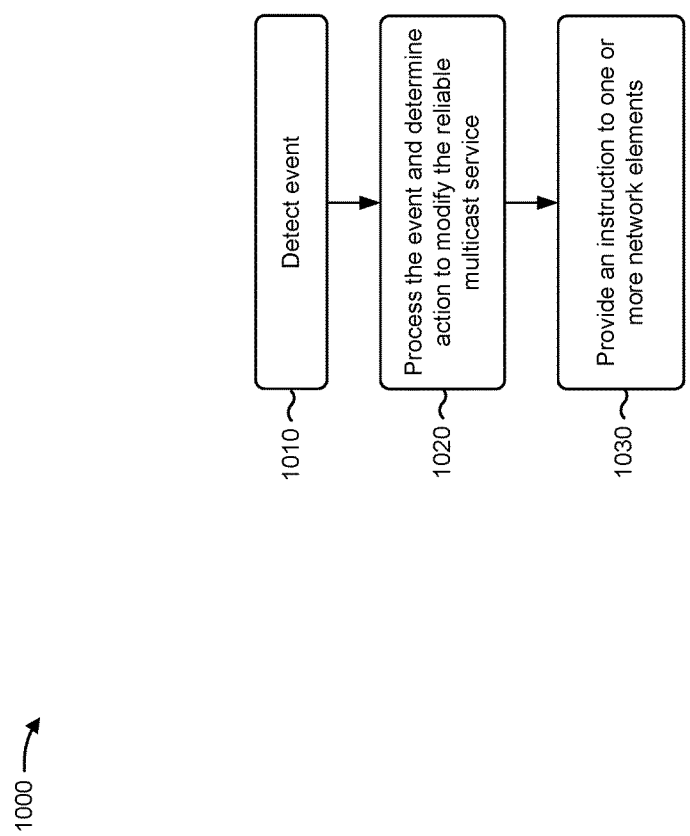
FIG. 10 is a flow chart of an example process for modifying the reliable multicast service based on detecting an event.

FIG. 10 is a flow chart of an example process 1000 for modifying the reliable multicast service based on detecting an event. In some implementations, one or more process blocks of FIG. 10 may be performed by orchestration device 210. In some implementations, one or more process blocks of FIG. 10 may be performed by another device or a group of devices separate from or including orchestration device 210, such as network elements 220, multicast source 230, user device 250, inventory device 260, and/or administration device 270.

As shown in FIG. 10, process 1000 may include detecting an event (block 1010). For example, orchestration device 210 may detect an event based on monitoring status information received from network elements 220. In some implementations, an event may include a failure of a link, a utilization of a link satisfying a threshold, a failure of one or more network elements 220, or the like. Additionally, or alternatively, an event may include information associated with one or more network elements 220 in supporting the reliable multicast service.

For example, an event may include information associated with network elements 220, such as cache utilization (e.g., a retransmission cache utilization), CPU utilization, a rate of transmission of multicast traffic over a particular link, a retransmission request rate associated with a particular user device 250, a rate of datagram loss, a quantity of missing datagrams, a rate of retransmission requests, a delay in delivering a datagram based on a retransmission request, a quantity of received retransmission requests, a quantity of forwarded retransmission requests, a quantity of user devices 250 that are receiving multicast traffic associated with multicast source 230, a quantity of user devices 250 that are receiving multicast traffic associated with another multicast source 230, a quantity of requests to receive multicast traffic, a location of user devices 250, a change in location of a particular user device 250, or the like. Additionally, an event may include one or more of the aforementioned events satisfying a threshold, in some implementations.

In some implementations, orchestration device 210 may predict an event based on analyzing previous patterns. For example, orchestration device 210 may analyze stored information and may determine that multicast traffic associated with multicast source 230 increases by a particular quantity at a particular time and/or date, that particular network elements 220 may support a particular quantity of traffic at a particular time and/or date, or the like. Orchestration device 210 may provide instructions to one or more network elements 220 to modify the reliable multicast service if the predicted event occurs, in some implementations.

In some implementations, orchestration device 210 may predict an event based on detecting another event. For example, orchestration device 210 may analyze historical information associated with the reliable multicast service and may determine a likelihood that a particular event (or events) may occur based on the occurrence of another event. For example, orchestration device 210 may determine that if a particular user device 250 enters a particular service area (e.g., associated with a particular network element 220), then one or more other events may occur (e.g., another user device 250 may enter the service area, a particular quantity of user devices 250 may request multicast traffic, a particular user device 250 associated with a high retransmission request rate may enter the service area, or the like). Orchestration device 210 may provide an instruction to one or more network elements 220 to modify the reliable multicast service if the predicted event occurs, in some implementations.

In some implementations, an event may include a subscriber service allocation request. For example, a reliable multicast service subscriber may register to allocate resources. For example, the subscriber may provide (e.g., via a portal associated with network interface module 405) orchestration device 210 with information identifying a request to receive reliable multicast traffic associated with multicast source 230, an expected traffic rate, a date, time, and/or a duration for the requested resources, a start time, an end time, one or more locations of user devices 250, or the like. Orchestration device 210 (e.g., via subscriber service module 440) may determine whether the subscriber is entitled to the requested service, and may store the information associated with the requested service.

As further shown in FIG. 10, process 1000 may include processing the event and determining an action to modify the reliable multicast service (block 1020). For example, orchestration device 210 may process the event and may identify an action to be performed to modify the reliable multicast service.

In some implementations, orchestration device 210 may determine to re-configure one or more network elements 220 based on detecting an event. For example, orchestration device 210 may modify one or more functions on one or more network elements 220 (e.g., may re-configure a function associated with local service agent 520). For example, orchestration device 210 may deactivate functionality that supports the reliable multicast service on one or more network elements 220. For example, orchestration device 210 may determine a different network element 220 to provide a particular function (e.g., interact with multicast source 230, support retransmission requests, etc.), and may deactivate functionality on a particular network element 220 that was previously providing the particular function.

Additionally, or alternatively, orchestration device 210 may determine to activate a particular function on one or more network elements 220 (e.g., may configure one or more network elements 220 to support the reliable multicast service). For example, based on a request from user device 250 to receive multicast traffic associated with a particular multicast source 230, orchestration device 210 may configure one or more network elements 220 to support reliable multicast service associated with the particular multicast source 230.

Additionally, or alternatively, orchestration device 210 may determine to re-assign functionality to one or more network elements 220. For example, orchestration device 210 may determine that configuring a particular network element 220 (e.g., different than a currently configured network element 220) to support a reliable multicast service, that is closer to multicast source 230, may result in a higher transmission rate, a reduced quantity of retransmission requests, or the like. Orchestration device 210 may activate functionality on the particular network element 220 that is closer to multicast source 230 (e.g., configure network element 220 to receive multicast datagrams and request retransmission of multicast datagrams), and may deactivate functionality on the network element 220 that was previously interacting with multicast source 230. In this way, reliable multicast service disruption may be minimized.

In some implementations, orchestration device 210 may determine to re-configure resources on one or more network elements 220 based on detecting an event. For example, orchestration device 210 may modify a quantity of resources allocated to a particular network element 220. For example, orchestration device 210 may determine that a resource utilization (e.g., CPU, memory (e.g., retransmission cache), or the like) associated with a particular network element 220 satisfies a threshold. Further, orchestration device 210 may determine to increase a quantity of resources associated with the particular network element 220 (e.g., may increase memory associated with a particular network element 220 that may be allocated to supporting the reliable multicast service, or the like) based on determining that the resource utilization satisfied the threshold.

In some implementations, orchestration device 210 may determine to configure resource allocation for a particular multicast source 230. For example, orchestration device 210 may allocate resources for a particular network element 220

(e.g., supporting reliable multicast service for the particular multicast source 230) based on a QoS profile of a particular subscriber associated with a particular user device 250 (e.g., a particular user device 250 that is located in a service area of network element 220). For example, orchestration device 210 may determine that a particular subscriber requires accommodation of a particular retransmission rate (e.g., based on a QoS profile, a reliability of a wireless link associated with user device 250, or the like). Orchestration device 210 may configure resources (e.g., increase memory to support caching of multicast datagrams) on the particular network element 220 that is forwarding multicast traffic to the particular user device 250.

In some implementations, orchestration device 210 may determine to configure one or more network elements 220 based on a product license. For example, assignment of functionality to one or more network elements 220 (e.g., utilizing local service agent 520) to support a reliable multicast service may correspond to a financial cost. For example, a vendor associated with network element 220 may charge a service provider based on a quantity of network elements 220 that are configured to support the reliable multicast service. In some implementations, orchestration device 210 may minimize the quantity of network elements 220 that are needed to support the reliable multicast service (e.g., may configure less network elements 220 to provide the reliable multicast service). For example, orchestration device 210 may determine that a particular network element 220 (e.g., that is configured to support the reliable multicast service) may provide the reliable multicast service to a downstream user device 250 (e.g., associated with a particular network element 220 that is not configured to support the reliable multicast service). Orchestration device 210 may monitor network information and may verify that the reliable multicast service being provided to the downstream user device 250 is within the terms of a service profile associated with the downstream user device 250.

In some implementations, orchestration device 210 may determine to manipulate the forwarding characteristics throughout the reliable multicast network. For example, orchestration device 210 may monitor status information and may detect an event, such as a retransmission request rate (e.g., to a particular network element 220) satisfying a threshold. In some implementations, if multicast source 230 determines that a particular network element 220 (e.g., receiving datagrams from multicast source 230 and requesting retransmission of datagrams from multicast source 230) provides a particular quantity of retransmission requests, then multicast source 230 may deny service to that particular network element 220.

Similarly, if other network elements 220 (e.g., downstream network elements 220) are associated with a particular quantity of retransmission requests, then one or more network elements 220 (e.g., upstream network elements 220) may discontinue providing service to the one or more network elements 220 associated with the increased retransmission requests (e.g., the downstream network elements 220).

Additionally, in some implementations, one or more user devices 250 that are located in service areas associated with particular network elements 220 (e.g., network elements 220 that are associated with higher retransmission requests) may include particular QoS profiles. Thus, orchestration device 210 may accommodate such user devices 250 by modifying routing characteristics, as shown in more detail in association with FIGS. 11A and 11B.

In some implementations, orchestration device 210 may modify the reliable multicast service based on a service agreement. For example, a user associated with user device 250 may have a service agreement with a reliable multicast service provider. The service agreement may, for example, specify requirements associated with a multicast datagram loss rate, a delay for receiving multicast datagrams, a level of support for mobility, or the like. In some implementations, the service agreement may specify one or more events that may entitle the subscriber to compensation and/or may specify contributing factors that may be considered when determining compensation.

Orchestration device 210 may detect one or more events that may indicate a deviation from the service agreement such as, for example, a rate of non-received multicast datagrams that exceeds a threshold, a delay in delivering a datagram based on a retransmission request, or the like. For example, orchestration device 210 may detect such events by tracking acknowledgement messages and/or by analyzing statistics collected by one or more network elements 220. For example, network elements 220 that provide support for retransmission requests may store information identifying retransmission rates (e.g., by tracking acknowledgments received by user devices 250 and/or other network elements 220).

In some implementations, orchestration device 210 may identify one or more factors that may contribute to multicast datagram loss. For example, limited resource allocation (e.g., cache resources) may cause an inability to retransmit a requested datagram. Orchestration device 210 may compare a sequence number of a lost datagram with an event associated with a dropped datagram, having the same sequence number, from a retransmission cache of a particular network element 220, for example. Additionally, or alternatively, a delay in responding to a retransmission request may be caused by a particular network element 220 (e.g., that is providing support for retransmission requests) being located a particular distance away from one or more user devices 250 (e.g., the user device associated with the service agreement).

Additionally, or alternatively, mobility events may cause datagram loss. For example, a service agreement may identify a lossless mobility feature. Orchestration device 210 may determine a datagram loss based on a mobility event based on comparing time stamps associated with regional registration request messages (e.g., with a first network element 220 and a second network element 220), a sequence number that was last received in a service area associated with first network element 220, a time stamp of one or more retransmission requests, and one or more sequence numbers of lost datagrams in another service area (e.g., associated with the second network element 220).

In some implementations, orchestration device 210 may determine an action to modify the reliable multicast service based on identifying a deviation from the service agreement. For example, orchestration device 210 may increase a resource setting (e.g., memory) on a particular network element 220 that is supporting retransmission requests to user device 250 (e.g., associated with the service agreement). Additionally, or alternatively, orchestration device 210 may configure another network element 220 to provide support (e.g., support retransmission requests) for user device 250.

For example, assume that user device 250 is associated with a service agreement that allows an average multicast datagram loss rate value (e.g., 1%) over a particular time frame (e.g., 1 hour) in association with a particular multicast source 230. Further, assume that the multicast loss rate may not exceed a particular value (e.g., 3%) per a particular measurement window (e.g., 1 minute) for a particular quantity of measurement windows (e.g., four per hour).

Further, assume that, per the service agreement, the subscriber associated with user device 250 may be entitled to compensation if a service deviation is a result of issues associated with network elements 220 supporting the reliable multicast service.

In some implementations, network elements 220 may use a synchronized timing reference. Further, orchestration device 210 may collect statistical information and may compare statistics across network elements 220 in relation to the timing reference. In some implementations, orchestration device 210 (e.g., via subscriber service module 440) may identify one or more metrics associated with the service agreement that may be monitored. For example, orchestration device 210 may identify a particular network element 220 (e.g., network element 220-1) to provide service for user device 250. For example, network element 220-1 may receive acknowledgement messages and/or retransmission requests from user device 250. Orchestration device 210 may identify network element 220-1 and may collect statistics associated with network element 220-1.

Orchestration device 210 may configure a data structure associated with network element 220-1 to monitor statistics. For example, the data structure may include a timer that resets based on a first interval (e.g., every minute), a first counter (e.g., "counter_1") that counts the quantity of multicast datagrams that are received from another network element 220 (or from multicast source 230) and that resets based on the first interval (e.g., every minute), a second counter (e.g., "counter_2") that counts a quantity of multicast datagrams associated with retransmission requests from user device 250 during the first interval (e.g., one minute) and that resets based on the first interval (e.g., every minute), and a first variable (e.g., "variable_1") that calculates a datagram loss ratio during the first interval (e.g., (value of counter_2/value of counter_1)×100) and that resets with each calculation.

Additionally, the data structure may include a third counter (e.g., "counter_3") that counts a quantity of times that variable_1 exceeds a particular value (e.g., 4%) during a second interval (e.g., an hour) and that generates a report to orchestration device 210 based on variable_1 exceeding the particular value, a fourth counter (e.g., "counter_4") that counts a quantity of multicast datagrams that are received from another network element 220 or multicast source 230 and that resets based on the second interval (e.g., every hour), a fifth counter that counts a quantity of multicast datagrams that are associated with retransmission requests from user device 250 during the second interval (e.g., every hour) and that resets based on the second interval, and a second variable (e.g., "variable_2") that calculates a datagrams loss ratio during the second interval (e.g., (value of counter_5/value of counter_4)×100). If the second variable exceeds a threshold (e.g., 1%) then network element 220 may generate an event report to orchestration device 210.

In some implementations, assume that orchestration device 210 determines that datagram loss exceeded a particular threshold (e.g., 4%) a particular quantity of times (e.g., five) during the second interval (e.g., hour). Orchestration device 210 may provide information that determines whether the user associated with the service agreement is entitled to compensation, for example. Orchestration device 210 may associate the deviation from the service agreement with one or more contributing factors, such as for example, reliable multicast forwarding, reliable multicast mobility events, and/or a wireless link issues related with user device 250.

If reliable multicast forwarding is associated with any of the five instances of deviation from the service agreement, then the subscriber may be entitled to compensation. For example, orchestration device 210 may store information identifying time stamps associated with each deviation from the service agreement and may determine a quantity of deviations that are related to mobility events, a quantity of deviations that are related to multicast forwarding (e.g., identified by network element 220-1 dropping datagrams from a retransmission cache and requesting datagrams including the same sequence numbers as the dropped datagrams).

Orchestration device 210 may determine which deviations from the service agreement are attributable to the service provider, and may provide the service provider with information identifying such deviations.

As further shown in FIG. 10, process 1000 may include providing an instruction to one or more network elements (block 1030). For example, orchestration device 210 may provide an instruction to one or more network elements 220 based on determining an action to modify the reliable multicast service.

In some implementations, the instruction may instruct a network element 220 to activate a functionality to support the reliable multicast service (e.g., receive multicast datagrams from multicast source 230, request retransmission of multicast datagrams from multicast source, support retransmission requests from other network elements 220 and/or user devices 250, or the like).

Additionally, or alternatively, the instruction may instruct one or more network elements 220 to deactivate functionality associated with supporting the reliable multicast service. Additionally, or alternatively, the instruction may instruct one or more network elements 220 to provide a different functionality supporting the reliable multicast service (e.g., local service agent 520 providing a different function than an initial configuration).

In some implementations, the instruction may instruct one or more network elements 220 to request multicast traffic from a different network element 220 (e.g., different than a particular upstream network element 220 that was originally providing multicast traffic). Additionally, or alternatively, the instruction may instruct one or more network elements 220 to modify resources that may be allocated to supporting the reliable multicast service (e.g., increase memory resources to store multicast datagrams, decrease memory resources to store multicast datagrams, or the like).

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

FIGS. 11A, 11B, 12A, 12B, 13A, and 13B are diagrams of example implementations 1100, 1200, and 1300 relating to example process 1000 shown in FIG. 10. FIGS. 11A, 11B, 12A, 12B, 13A, and 13B show examples of modifying the reliable multicast service based on detecting an event.

Figure 11A:
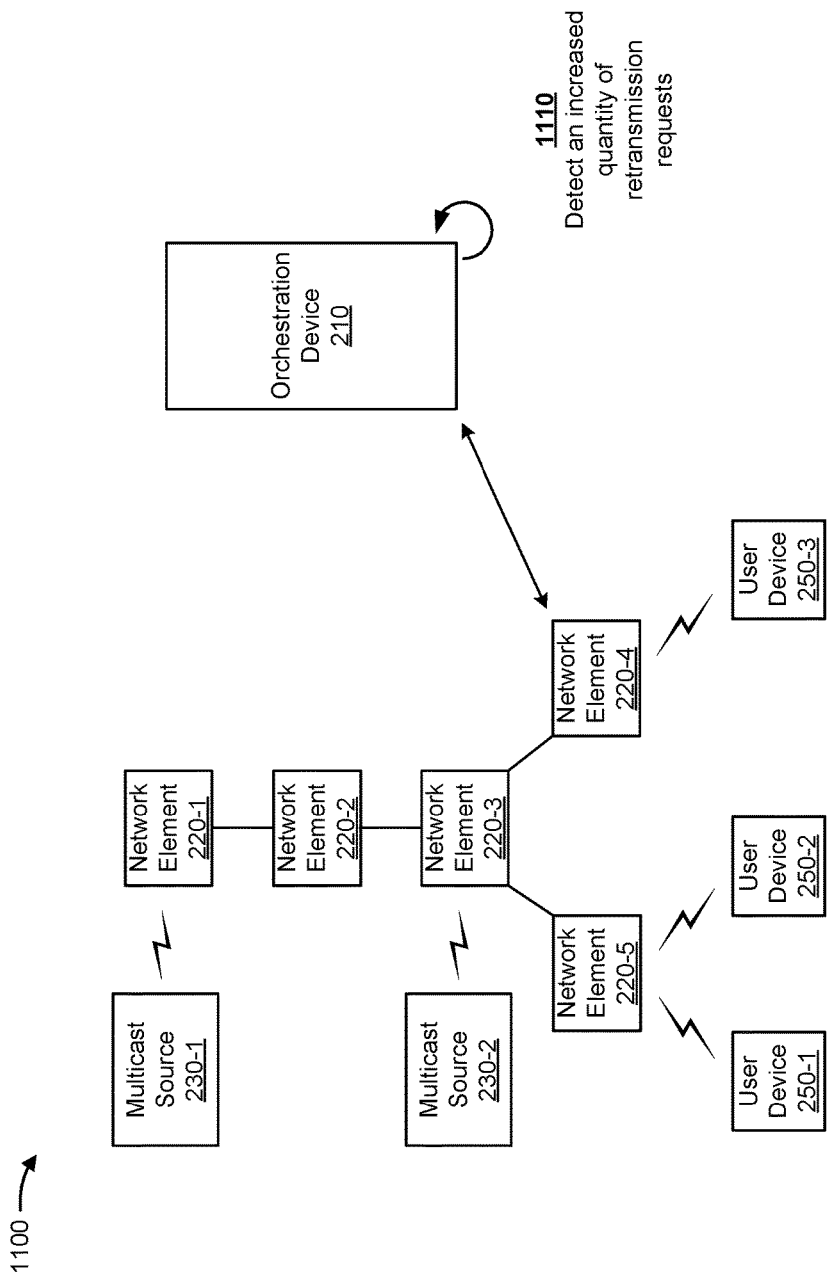

As shown in FIG. 11A, network element 220-1 may interact with multicast source 230-1 (e.g., receive datagrams and request missing datagrams), and network element 220-3 may interact with multicast source 230-2. As further shown, network element 220-5 may provide multicast traffic associated with multicast source 230-1 to user device 250-1 and may provide multicast traffic associated with multicast source 230-2 to user device 250-2. Further, network element 220-4 may provide multicast traffic associated with multicast source 230-1 to user device 250-3. For example, assume that user device 250-1 and user device 250-2 are associated with contracts for a first class of reliable multicast service, and that user device 250-3 is associated with a contract for a second class (e.g., lower than the first class of service associated with user device 250-1 and/or user device 250-2) of reliable multicast service.

For example, assume that multicast traffic associated with multicast source 230-1 exhibits characteristics that may not be accommodated by user device 250-3 (e.g., based on low quality wireless links in a service area associated with network element 220-4). Network element 220-3 may receive, from user device 250-3, an increased quantity of retransmission requests (e.g., greater than a threshold). As shown by reference number 1110, orchestration device 210 may detect the increased quantity of retransmission requests, and may determine that user device 250-3 may be affecting the reliable multicast service (e.g., associated with multicast source 230-1).

In some implementations, orchestration device 210 may instruct network element 220-3 to provide, to network element 220-4, a message instructing network element 220-4 that network element 220-2 may provide network element 220-4 with reliable multicast service support. Based on receiving the message from network element 220-3, network element 220-4 may provide network element 220-2 with a registration message including a logical hierarchical extension directed to network element 220-2. The logical hierarchical extension may indicate to other network elements 220 that a typical physical hierarchy for network element 220-2, network element 220-3, and network element 220-4 is bypassed for multicast traffic associated with multicast source 230-1.

In some implementations, network element 220-3 may provide encapsulated datagrams (e.g., encapsulated using generic routing encapsulation (GRE)) between network element 220-2 and network element 220-4. Additionally, network element 220-3 may provide multicast traffic associated with multicast source 230-1 to network element 220-4 without providing reliable multicast support (e.g., without supporting retransmission requests).

Figure 11B:
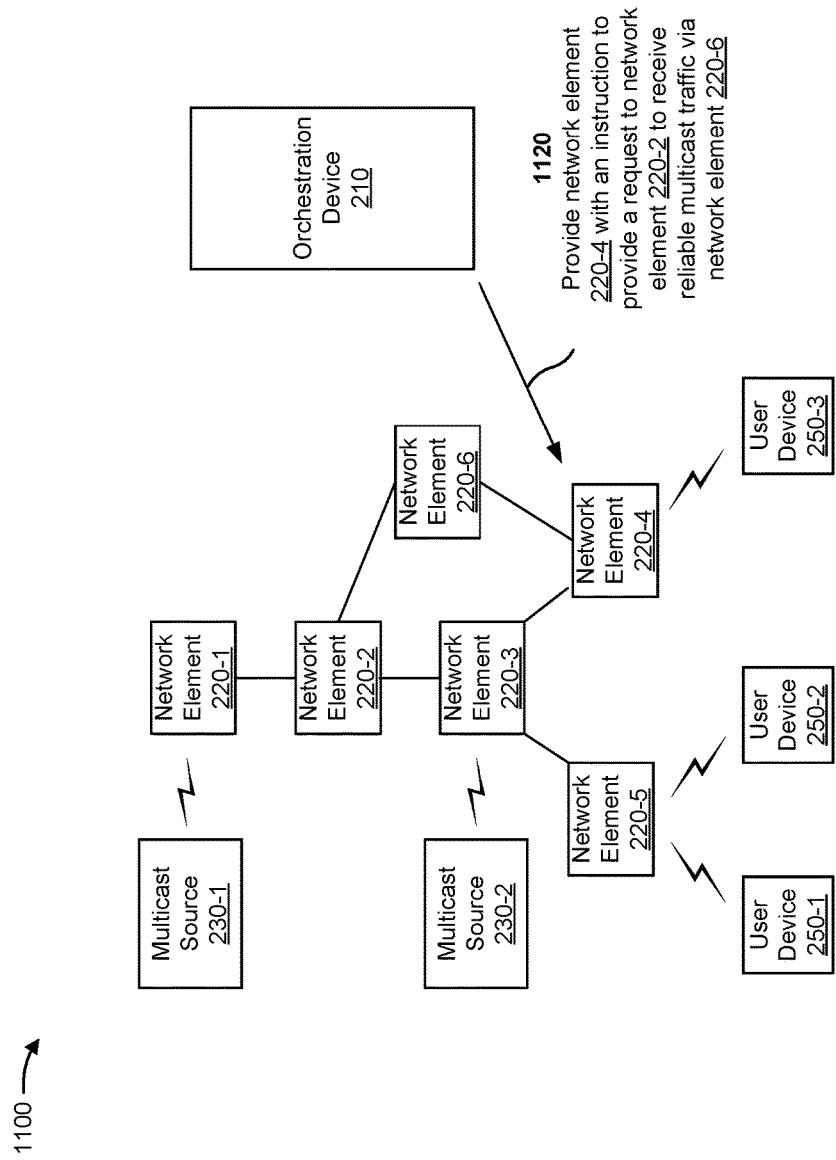

As shown in FIG. 11B, orchestration device 210 may instruct network element 220-3 to provide a message to network element 220-4 instructing network element 220-4 that network element 220-3 is no longer supporting multicast traffic forwarding to network element 220-4 (e.g., based on user device 250-3 having a negative effect on the reliable multicast service). Orchestration device 210 may identify an alternate routing path through network element 220-6 between network element 220-2 and network element 220-4, for example. As shown by reference number 1120, orchestration device 210 may provide network element 220-4 with an instruction for network element 220-4 to provide a request to network element 220-2 to receive reliable multicast traffic via network element 220-6. In this way, a quantity of retransmission requests from user device 250-3 to network element 220-3 may be reduced, thereby allowing network element 220-3 to allocate resources towards supporting a reliable multicast service for user devices 250-1 and/or user device 250-2.

As shown in FIG. 12A, orchestration device 210 may modify a configuration of one or more network elements 220 based on detecting an event. For example, assume that orchestration device 210 detects a similar event as described in FIG. 11A (e.g., increased retransmission requests from user device 250-3). As shown by reference number 1210, orchestration device 210 may instruct network element 220-3 to change a configuration supporting reliable multicast service. For example, as shown by reference number 1220, assume that network element 220-3 was forwarding multicast traffic associated with multicast source 230-1 and was supporting retransmission requests associated with multicast source 230-1.

Figure 12B:
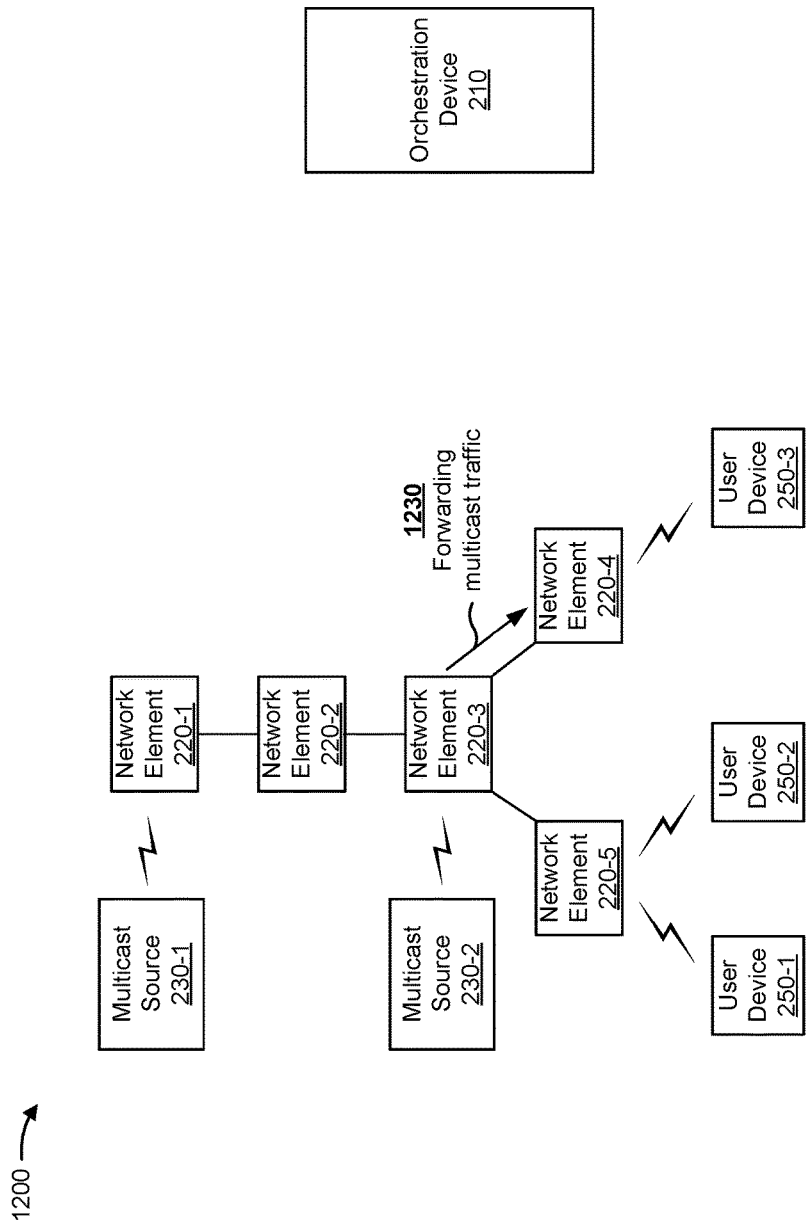

As shown in FIG. 12B, orchestration device 210 may re-configure network element 220-3 to forward multicast traffic associated with multicast source 230-1 and not provide support for retransmission requests (e.g., not store datagrams in a cache). Based on receiving the instruction, and as shown by reference number 1230, network element 220-3 may forward, to network element 220-4, multicast traffic associated with multicast source 230-1 and may not support retransmission requests from network element 220-4. In this way, network element 220-3 may recover cache space, which may reduce the quantity of retransmission requests that are transmitted to multicast source 230-2 and/or multicast source 230-1.

Figure 13A:
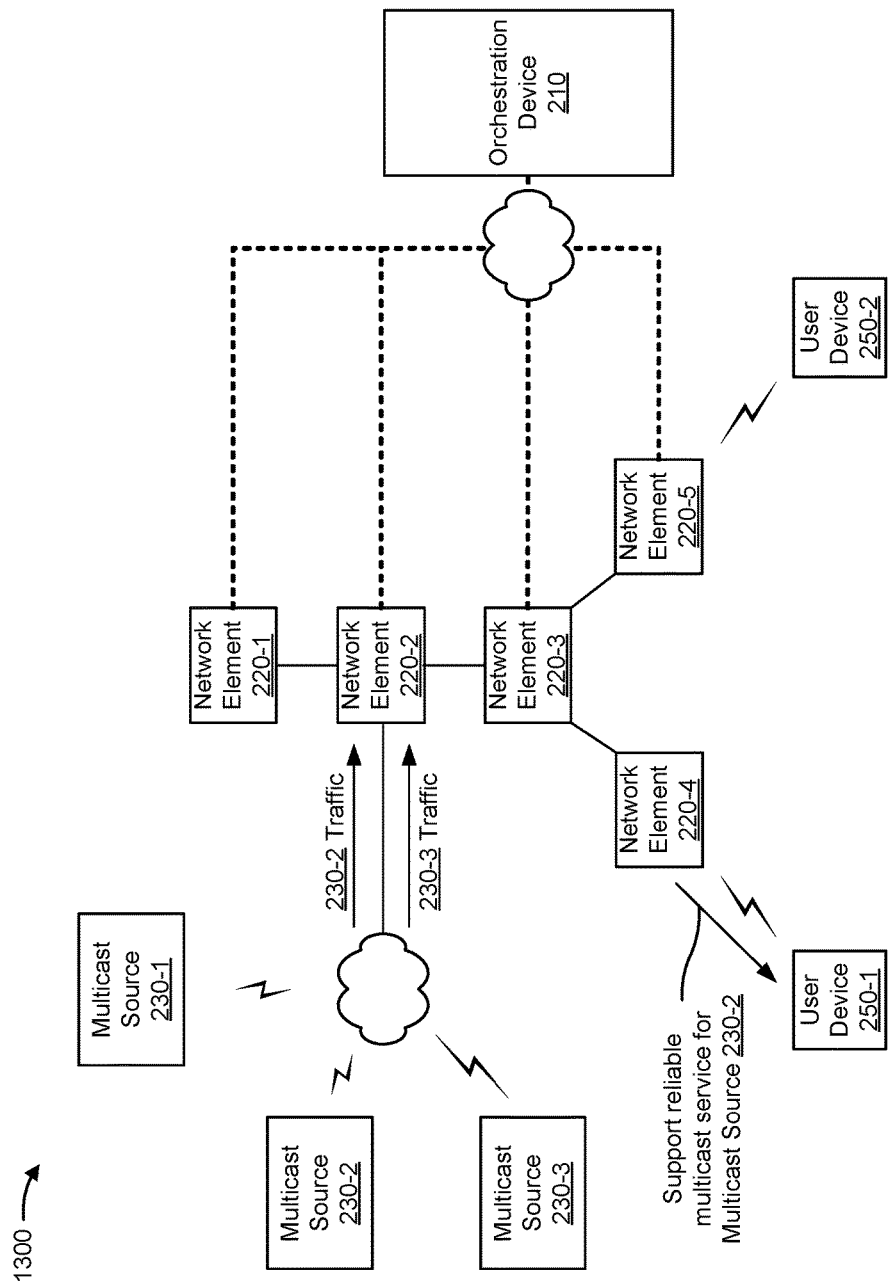

As shown in FIG. 13A, user device 250-1 and user device 250-2 may include IoT devices that are receiving multicast traffic and that are dynamically capable of being associated with one or more classes (e.g., a first class or a second class). For example, both user device 250-1 and user device 250-2 may be receiving multicast traffic associated with multicast source 230-1. For example, multicast source 230-1 may provide information that may be relevant to both classes (e.g., the first class and the second class) and may provide configuration information that may allow user device 250-1 and/or user device 250-2 to identify class information (e.g., the class to which user device 250-1 and/or user device 250-2 may belong).

User device 250-1 and user device 250-2 may provide, via unicast, information to servers in the network, which may process the received information. For example, the servers may act as multicast sources (e.g., may act as multicast source 230-2 or multicast source 230-3). For example, multicast source 230-2 may provide configuration information and/or software information that may be customized for a particular class (e.g., the first class), and multicast source 230-3 may provide configuration information and/or software information that may be customized for another class (e.g., the second class).

In some implementations, user device 250-1 and user device 250-2 may determine which particular class user device 250-1 and user device 250-2 are associated with, and may receive multicast traffic associated with the particular class. For example, user device 250-2 may be associated with the second class and may receive information from multicast source 230-2. Further, assume that user device 250-2 is associated with a higher QoS, which may require a minimal delay in receiving multicast traffic.

As further shown in FIG. 13A, user device 250-1 may be receiving multicast traffic via network element 220-4, and user device 250-2 may be receiving multicast traffic via network element 220-5, for example. Orchestration device 210 may instruct network element 220-2 to interact with multicast source 230-2 and multicast source 230-3 (e.g., receive multicast datagrams, request retransmission of multicast datagrams, and support retransmission of multicast datagrams). Additionally, orchestration device 210 may instruct network element 220-4 to support reliable multicast service for traffic associated with multicast source 230-1 (e.g., forward multicast datagrams and support retransmission requests). Further, orchestration device 210 may instruct network element 220-5 to support reliable multicast service for traffic associated with multicast source 230-2 (e.g., forward multicast datagrams and support retransmission requests). For example, orchestration device 210 may configure network element 220-4 and network element 220-5 based on identifying that network element 220-4 and/or network element 220-5 may support a reliable multicast service associated with, at maximum, a single multicast source.

Figure 13B:
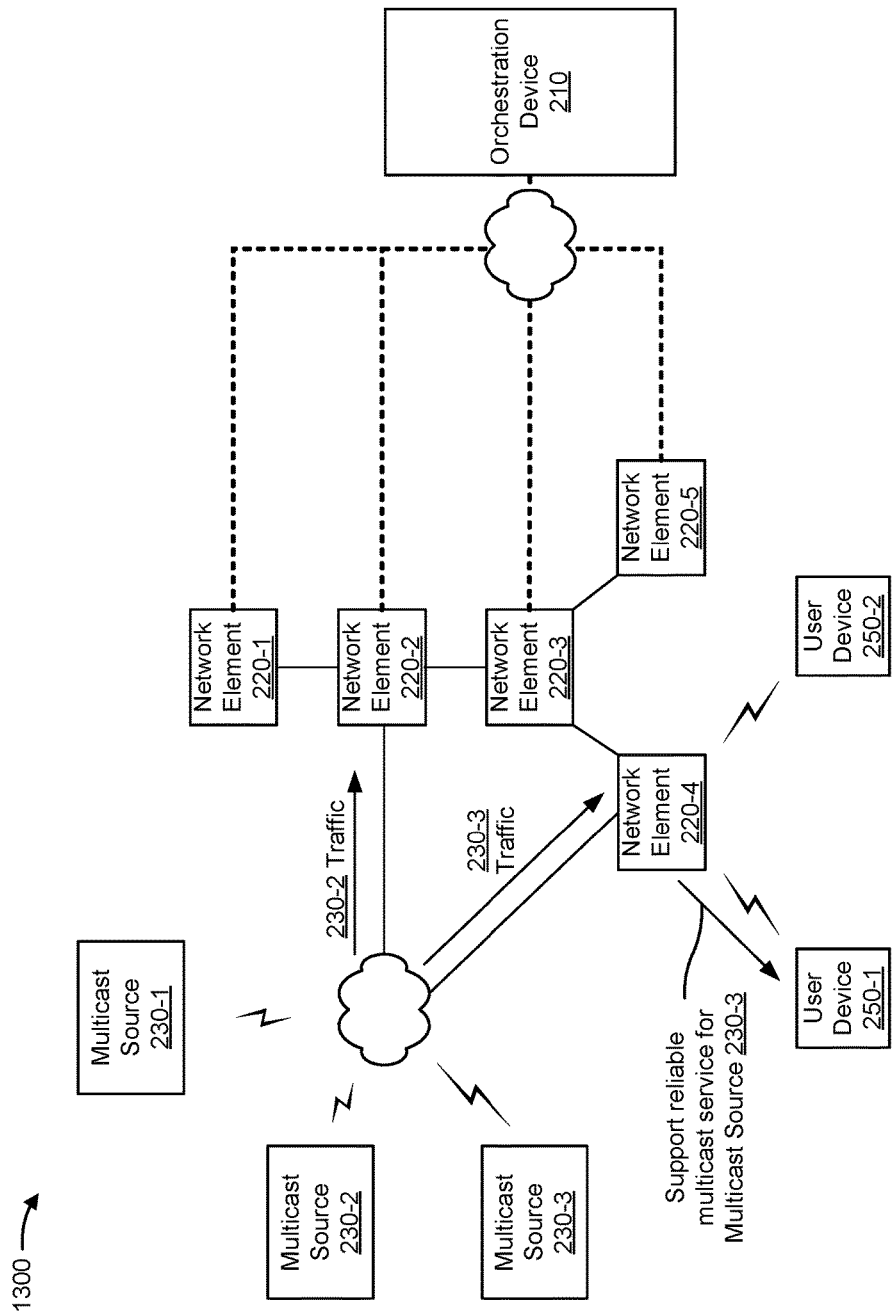

As shown in FIG. 13B, assume that user device 250-2 moves from a service area associated with network element 220-5 to a service area associated with network element 220-4. Orchestration device 210 may receive information identifying the mobility event associated with user device 250-2, for example. Based on determining that network element 220-4 may support a reliable multicast service associated with, at maximum, a single multicast source 230, orchestration device 210 may re-configure one or more network elements 220. For example, orchestration device 210 may identify that user device 250-2 is associated with a higher QoS and may configure network elements 220 to minimize delay associated with multicast traffic associated with user device 250-2.

For example, orchestration device 210 may instruct network element 220-4 to interact with multicast source 230-3 (e.g., receive multicast datagrams, request multicast datagrams, and support retransmission requests). Further, orchestration device 210 may instruct network element 220-3 to support reliable multicast service associated with multicast source 230-2 (e.g., based on configuring network element 220-4 to support reliable multicast service associated with multicast source 230-2). In this way, delay in forwarding multicast traffic to user device 250-2 may be minimized.

As indicated above, FIGS. 11A, 11B, 12A, 12B, 13A, and 13B are provided merely as an example. Other examples are possible and may differ from what was described with regard to FIGS. 11A, 11B, 12A, 12B, 13A, and 13B.

FIG. 14 is a flow chart of an example process 1400 for configuring and modifying a reliable multicast service. In some implementations, one or more process blocks of FIG. 14 may be performed by orchestration device 210. In some implementations, one or more process blocks of FIG. 14 may be performed by another device or a group of devices separate from or including orchestration device 210, such as network element 220, multicast source 230, user device 250, inventory device 260, and/or administration device 270.

As shown in FIG. 14, process 1400 may include receiving information associated with a reliable multicast service to be provided (block 1410). For example, orchestration device 210 may receive information associated with a reliable multicast service to be provided. In some implementations, orchestration device 210 may receive (e.g., from a user, a content provider and/or from another device, such as user device 250 and/or multicast source 230) information associated with a reliable multicast service that identifies the type of reliable multicast service (e.g., a voice communication service, a video service, a machine-to-machine communication service, etc.). Additionally, orchestration device 210 may receive information that identifies one or more requirements of the reliable multicast service (e.g., bandwidth requirements, packet delay requirements, a quantity of users and/or devices 250 to be served by the reliable multicast service, mobility of user devices 250, traffic capacity requirements, etc.), a time period that the reliable multicast service is to be provided, a geographic location associated with the reliable multicast service, etc.

As further shown in FIG. 14, process 1400 may include receiving information associated with network elements (block 1420). For example, as described above in association with FIG. 6, orchestration device 210 may receive infrastructure information (e.g., identifying types of network elements 220 to provide the reliable multicast service, capabilities of network elements 220 to provide the reliable multicast service, or the like).

As further shown in FIG. 14, process 1400 may include configuring the network elements to provide the reliable multicast service (block 1430). For example, orchestration device 210 may configure the network elements 220 to provide the reliable multicast service.

In some implementations, as described above in association with FIG. 6, orchestration device 210 may configure one or more network elements 220 by assigning a functionality to one or more network elements 220 (e.g., to receive multicast datagrams from multicast source 230, to request multicast datagrams from multicast source 230, to forward multicast datagrams to other network elements 220 and/or user devices 250, to support retransmission requests from other network elements 220 and/or user devices 250, or the like). Additionally, or alternatively, orchestration device 210 may configure one or more network elements 220 by configuring a quantity of resources (e.g., CPU resources, memory resources, etc. that may be allocated to supporting the reliable multicast service) associated with network element 220.

In some implementations, orchestration device 210 may configure the network elements 220 based on historical information regarding the reliable multicast service. Additionally, or alternatively, orchestration device 210 may configure network elements 220 based on initialization guidelines, for example.

As further shown in FIG. 14, process 1400 may include monitoring the network elements (block 1440). For example, orchestration device 210 may monitor network elements 220. In some implementations, as described above in connection with FIG. 10, orchestration device 210 may receive status information from one or more network elements 220. For example, orchestration device 210 may receive information from one or more network elements identifying cache utilization, CPU utilization, a rate of transmission of multicast datagrams, a rate of reception of multicast datagrams, a quantity of user devices 250 to which a particular network element 220 is providing reliable multicast service, a quantity of user devices 250 that are requesting multicast traffic, etc.

In some implementations, network elements 220 may provide orchestration device 210 with particular information based on a configuration received from orchestration device 210. For example, orchestration device 210 may configure network elements 220 to provide utilization (e.g., cache, CPU, etc.) information based on a utilization value that satisfies a threshold. Additionally, or alternatively, orchestration device 210 may instruct a particular quantity of network elements 220 to provide status information (e.g., network elements 220 associated with a particular link). In this way, network, memory, and processor resources associated with orchestration device 210 and/or network elements 220 may be conserved.

Additionally, or alternatively, orchestration device 210 may monitor the reliable multicast network and may identify, for example, a failure of a link, a utilization of a link, a failure of one or more network elements 220, mobility of user devices 250, a quantity of requests from user devices 250 for retransmission of multicast datagrams, or the like.

As further shown in FIG. 14, process 1400 may include detecting an event (block 1450). For example, orchestration device 210 may detect an event based on status information received from network elements 220. In some implementations, and as described in association with FIG. 10, an event may include a failure of a link, a utilization of a link satisfying a threshold, a failure of one or more network elements 220, or the like. Additionally, or alternatively, an event may include information associated with one or more network elements 220, such as cache utilization, CPU utilization, a quantity of retransmission requests, datagram rate associated with a particular link, a quantity of user devices 250 receiving multicast traffic, a quantity of user devices requesting multicast traffic, mobility of user devices 250, or the like.

In some implementations, orchestration device 210 may detect an event based on pattern analysis and/or stored information. For example, as described above in association with FIG. 6, orchestration device 210 may determine patterns associated with the reliable multicast service based on analyzing historical information. Additionally, orchestration device 210 may detect an event based on a subscriber service allocation request, as described above.

As further shown in FIG. 14, process 1400 may include providing an instruction to modify the reliable multicast service based on detecting the event (block 1460). For example, orchestration device 210 may provide, to one or more network elements 220, an instruction to modify the reliable multicast service based on detecting the event.

In some implementations, and as described above in association with FIGS. 6 and 10, orchestration device 210 may instruct one or more network elements 220 to activate functionality to support the reliable multicast service, to deactivate functionality supporting the reliable multicast service, to change a functionality supporting the reliable multicast service, or the like.

Additionally, or alternatively, orchestration device 210 may instruct one or more network elements 220 to modify a resource allocation (e.g., CPU, memory, etc.) to support the reliable multicast service. Additionally, or alternatively, orchestration device 210 may instruct one or more network elements 220 to receive and/or provide multicast datagrams from another network element 220 (e.g., may manipulate forwarding characteristics).

Implementations described herein may allow orchestration device 210 to configure network elements 220 to provide a reliable multicast service and to dynamically re-configure one or more network elements 220 based on monitoring the reliable multicast network.

Although FIG. 14 shows example blocks of process 1400, in some implementations, process 1400 may include additional blocks, fewer blocks, different blocks, or differently arranged blocks than those depicted in FIG. 14. Additionally, or alternatively, two or more of the blocks of process 1400 may be performed in parallel.

Implementations described herein may allow an orchestration device to configure a one or more network elements to provide a reliable multicast service. Additionally, implementations described herein may allow an orchestration device to modify the reliable multicast service based on monitoring the network elements. Implementations described herein may reduce the quantity of retransmission requests that are provided to a multicast source, thereby increasing multicast forwarding rate and conserving network, memory, and/or processor resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:

receive information associated with a reliable multicast service to be provided,
    the reliable multicast service permitting retransmission of multicast datagrams;
receive information associated with a plurality of network devices associated with providing the reliable multicast service;
configure the plurality of network devices to provide the reliable multicast service,
    configuring the plurality of network devices including configuring a first network device, of the plurality of network devices, to receive multicast traffic from a second network device of the plurality of network devices;
monitor the plurality of network devices;
detect an event associated with the reliable multicast service based on monitoring the plurality of network devices,
    detecting the event including detecting the event based on determining that a threshold quantity of retransmission requests have been received by the first network device; and
provide an instruction, to the first network device of the plurality of network devices, to modify the reliable multicast service based on detecting the event,
    the instruction instructing the first network device to request multicast traffic from a third network device of the plurality of network devices,
        the third network device being different from the second network device.

2. The device of claim 1, where the one or more processors, when detecting the event, are to:
    determine that a resource utilization associated with the first network device, of the plurality of network devices, satisfies a threshold; and
    where the instruction further instructs the first network device to increase a quantity of a resource to be utilized to provide the reliable multicast service.

3. The device of claim 1, where the one or more processors, when detecting the event, are to:
    determine that the first network device, of the plurality of network devices, is providing the reliable multicast service to a user device,
        the user device being associated with a quality of service profile; and
    where the one or more processors, when providing the instruction to modify the reliable multicast service, are to:
    instruct the first network device to increase a quantity of a resource to be utilized to provide the reliable multicast service to the user device based on the quality of service profile.

4. The device of claim 1, where the event includes at least one of:
    a failure of a link;
    a failure of a network device of the plurality of network devices;
    a utilization of the link satisfying a threshold;
    a mobility event associated with a user device;
    a quantity of missing datagrams satisfying a threshold;
    a rate of retransmission requests satisfying a threshold; or
    a resource utilization of the network device satisfying a threshold.

5. The device of claim 1, where the one or more processors, when receiving the information associated with the reliable multicast service to be provided, are to:
    receive information identifying a requirement of the reliable multicast service to be provided,
    the requirement including at least one of:
    a time associated with the reliable multicast service;
    a quantity of user devices to be served by the reliable multicast service; or
    a traffic rate of the reliable multicast service; and
    where the one or more processors, when configuring the plurality of network devices to provide the reliable multicast service, are to:
    configure the plurality of network devices based on the requirement.

6. The device of claim 1, where the one or more processors, when monitoring the plurality of network devices, are to:
    receive information, from one or more of the plurality of network devices, that identifies at least one of:
    a quantity of retransmission requests received from one or more user devices;
    a resource utilization; or
    a quantity of requests from one or more user devices to receive multicast traffic associated with the reliable multicast service.

7. A non-transitory computer-readable medium storing instructions, the instructions comprising:
    one or more instructions that, when executed by one or more processors of a device, cause the one or more processors to:
    receive information associated with a reliable multicast service to be provided,
        the reliable multicast service permitting retransmission of multicast datagrams;
    receive information associated with a plurality of network devices associated with providing the reliable multicast service;
    configure the plurality of network devices to provide the reliable multicast service,
        configuring the plurality of network devices including:
            configuring a first network device, of the plurality of network devices, to request retransmission of multicast traffic from a multicast source and to use a first type of retransmission request, and
            configuring a second network device, of the plurality of network devices, to use a second type of retransmission request,
                the second type of retransmission request being different from the first type of retransmission request;
    monitor the plurality of network devices;
    detect an event associated with the reliable multicast service based on monitoring the plurality of network devices,
        where the one or more instructions, that cause the one or more processors to detect the event, cause the one or more processors to:
            determine, based on monitoring the plurality of network devices, that a resource utilization associated with the first network device satisfies a threshold; and
    provide, based on detecting the event, an instruction to one or more network devices of the plurality of network devices to modify the reliable multicast service,
        where the one or more instructions, that cause the one or more processors to provide the instruction, cause the one or more processors to:

provide, based on determining that the resource utilization associated with the first network device satisfies the threshold, the instruction to the second network device to request retransmission of the multicast traffic from the multicast source.

8. The non-transitory computer-readable medium of claim 7, where the one or more instructions further cause the one or more processors to:
provide a second instruction to the first network device to instruct the first network device to discontinue providing the reliable multicast service.

9. The non-transitory computer-readable medium of claim 7, where the one or more instructions further cause the one or more processors to:
provide a second instruction, to the first network device, to increase a quantity of a resource to be utilized to provide the reliable multicast service.

10. The non-transitory computer-readable medium of claim 7, where the one or more instructions, that cause the one or more processors to configure the plurality of network devices, cause the one or more processors to:
configure the first network device, of the plurality of network devices, to store multicast datagrams to support retransmission requests;
where the one or more instructions further cause the one or more processors to:
determine that a quantity of retransmission requests, received by the first network device, satisfies a threshold quantity of retransmission requests; and
provide a second instruction to the first network device to discontinue storing the multicast datagrams based on determining that the quantity of retransmission requests received by the first network device satisfies the threshold.

11. The non-transitory computer-readable medium of claim 7, where the one or more instructions, that cause the one or more processors to configure the plurality of network devices, cause the one or more processors to:
configure the plurality of network devices to provide multicast traffic to a user device via a first link;
where the one or more instructions, that cause the one or more processors to determine that the resource utilization associated with the first network device satisfies the threshold, cause the one or more processors to:
determine that a utilized capacity of the first link satisfies the threshold; and
where the one or more instructions further cause the one or more processors to:
provide a second instruction to one or more network devices to provide multicast traffic to the user device via a second link that is different from the first link.

12. The non-transitory computer-readable medium of claim 7, where the one or more instructions, that cause the one or more processors to receive information associated with the reliable multicast service to be provided, cause the one or more processors to:
receive information that identifies a type of reliable multicast service,
the type of reliable multicast service including one or more of:
a voice communication service,
a video service, or
a machine-to-machine communication service.

13. The non-transitory computer-readable medium of claim 7, where the one or more instructions, that cause the one or more processors to receive information associated with the plurality of network devices, cause the one or more processors to:
receive historical information associated with the plurality of network devices; and
where the one or more instructions, that cause the one or more processors to configure the plurality of network devices to provide the reliable multicast service, cause the one or more processors to:
configure the plurality of network devices to provide the reliable multicast service based on the historical information.

14. A method, comprising:
receiving, by a device, information associated with a reliable multicast service to be provided,
the reliable multicast service permitting retransmission of multicast datagrams;
receiving, by the device, information associated with a plurality of network devices associated with providing the reliable multicast service;
configuring, by the device, the plurality of network devices to provide the reliable multicast service, where configuring the plurality of network devices includes:
configuring a first network device, of the plurality of network devices, to receive multicast traffic from a second network device of the plurality of network devices;
monitoring, by the device, the plurality of network devices;
detecting, by the device and based on monitoring the plurality of network devices, an event associated with the reliable multicast service,
detecting the event including detecting the event based on determining that a threshold quantity of retransmission requests have been received by the first network device; and
providing, by the device and to the first network device, an instruction to modify the reliable multicast service based on detecting the event,
the instruction instructing the first network device to request multicast traffic from a third network device of the plurality of network devices,
the third network device being different from the second network device.

15. The method of claim 14, further comprising:
providing a second instruction to the first network device to increase a quantity of a resource to be utilized to provide the reliable multicast service.

16. The method of claim 14, where configuring the plurality of network devices comprises:
configuring the first network device, of the plurality of network devices, to provide a first type of acknowledgment or a second type of acknowledgment to the second network device based on receiving a multicast datagram from the second network device,
the first type of acknowledgment being different from the second type of acknowledgment.

17. The method of claim 14, where configuring the plurality of network devices to provide the reliable multicast service comprises:
configuring the first network device to form a logical connection with the second network device; and
where the method further comprises:
providing a second instruction to the first network device to form a logical connection with the third network device instead of the second network device.

18. The method of claim 14, where configuring the plurality of network devices comprises:
 configuring the first network device, of the plurality of network devices, to forward multicast traffic to the second network device, of the plurality of network devices, and to support retransmission requests, from the second network device, for multicast traffic; and
 the method further comprises:
  providing a second instruction to the first network device to forward multicast traffic to the second network device and to not support retransmission requests from the second network device.

19. The method of claim 14, where receiving information associated with the plurality of network devices comprises:
 receiving historical information associated with the plurality of network devices; and
 where configuring the plurality of network devices to provide the reliable multicast service comprises:
  configuring the plurality of network devices to provide the reliable multicast service based on the historical information.

20. The method of claim 14, where receiving information associated with the reliable multicast service to be provided comprises:
 receiving information that identifies one or more requirements of the reliable multicast service,
  the one or more requirements of the reliable multicast service including one or more of:
   one or more bandwidth requirements,
   one or more packet delay requirements, or
   one or more traffic capacity requirements.

* * * * *